(12) United States Patent
Eliott

(10) Patent No.: US 6,712,704 B2
(45) Date of Patent: *Mar. 30, 2004

(54) SECURITY SYSTEM FOR VIDEO GAME SYSTEM WITH HARD DISK DRIVE AND INTERNET ACCESS CAPABILITY

(75) Inventor: Scott Eliott, Redmond, WA (US)

(73) Assignee: Nintendo of America Inc., Redmond, WA (US)

(*) Notice: Subject to any disclaimer, the term of this patent is extended or adjusted under 35 U.S.C. 154(b) by 71 days.

This patent is subject to a terminal disclaimer.

(21) Appl. No.: 10/144,748

(22) Filed: May 15, 2002

(65) Prior Publication Data

US 2003/0032486 A1 Feb. 13, 2003

Related U.S. Application Data

(63) Continuation of application No. 09/384,189, filed on Aug. 27, 1999, now Pat. No. 6,468,160, which is a continuation-in-part of application No. 09/288,293, filed on Apr. 8, 1999, now Pat. No. 6,599,194.

(51) Int. Cl.[7] .......................... A63F 13/12; A63F 13/00
(52) U.S. Cl. ............................ 463/43; 463/41
(58) Field of Search .............................. 463/42, 41, 40, 463/43, 44, 29, 1; 380/2, 4, 21, 25, 28, 30, 43, 44, 54, 59, 223, 231, 232, 234, 241, 239, 282, 285; 705/1, 5, 26, 27, 51–59; 713/200, 201, 100, 2, 150–153, 164, 168, 169, 170, 173, 175, 176, 180

(56) References Cited

U.S. PATENT DOCUMENTS 4,247,106 A * 1/1981 Jeffers et al. .................. 463/29
4,299,386 A * 11/1981 Kulesza et al. ................. 463/8
5,251,909 A    10/1993 Reed et al.

(List continued on next page.)

OTHER PUBLICATIONS

Henry, "Local Company Big Player in Electronic Games", *The Sun*, Baltimore, MD., Nov. 1, 1998, 3 pages.

Freier et al., "The SSL Prtocol Version 3.0", Transport Layer Security Working Group, Internet–Draft, htto://cuising.uni-ge.ch/memories/Hugentobler/draft302.txt.gz.

WEBTV Networks, INC. webtv http:www.WebTV.net, all pages, Jan. 2000.

*Primary Examiner*—Michael O'Neill
(74) *Attorney, Agent, or Firm*—Nixon & Vanderhye P.C.

(57) ABSTRACT

An existing video game system is modified to include additional communication and storage capability via a modem and hard disk drive. In accordance with one embodiment of the present invention, the primary system security features are incorporated into a video game system expansion device having a hard disk drive. The security system does not rely on the relatively insecure video game system. The present exemplary embodiment focuses security control in a disk drive/mass media controlling engine which is physically disposed within the expansion device housing as close as possible to the hard disk drive and the downloaded video games and other data it is designed to protect. Security features are incorporated into, for example, a disk drive controlling processing engine to provide security features which extend far beyond simplistic password systems which have heretofore been utilized in conjunction with disk drive controllers. In accordance with an exemplary embodiment of the present invention, the disk controller also incorporates an encrypting engine which encrypts in accordance with a highly secure encrypting algorithm. A further level of security is provided in the illustrative embodiments by partitioning the hard drive into various partitions whose security/accessibility is tightly controlled. Each application program, e.g., a video game, has a predetermined number of private partitions, including a read only encrypted partition.

11 Claims, 26 Drawing Sheets

U.S. PATENT DOCUMENTS

| | | | | |
|---|---|---|---|---|
| 5,313,303 A | * | 5/1994 | Ersoz et al. | 348/439.1 |
| 5,350,176 A | * | 9/1994 | Hochstein et al. | 463/42 |
| 5,481,542 A | * | 1/1996 | Logston et al. | 725/131 |
| 5,497,479 A | * | 3/1996 | Hornbuckle | 463/29 |
| 5,538,255 A | * | 7/1996 | Barker | 463/41 |
| 5,558,339 A | * | 9/1996 | Perlman | 463/42 |
| 5,624,316 A | * | 4/1997 | Roskowski et al. | 463/45 |
| 5,630,757 A | * | 5/1997 | Gagin et al. | 463/43 |
| 5,668,950 A | * | 9/1997 | Kikuchi et al. | 709/217 |
| 5,685,775 A | * | 11/1997 | Bakoglu et al. | 463/41 |
| 5,762,555 A | * | 6/1998 | Crump et al. | 463/41 |
| 5,791,992 A | * | 8/1998 | Crump et al. | 463/41 |
| 5,841,980 A | * | 11/1998 | Waters et al. | 709/204 |
| 5,923,379 A | * | 7/1999 | Patterson | 725/70 |
| 6,018,712 A | * | 1/2000 | Pactong | 705/1 |
| 6,018,720 A | * | 1/2000 | Fujimoto | 705/26 |
| 6,022,274 A | * | 2/2000 | Takeda et al. | 463/44 |
| 6,038,316 A | * | 3/2000 | Dwork et al. | 705/51 |
| 6,055,314 A | * | 4/2000 | Spies et al. | 380/228 |
| 6,097,441 A | * | 8/2000 | Allport | 348/552 |
| 6,108,420 A | | 8/2000 | Larose et al. | |
| 6,169,976 B1 | * | 1/2001 | Colosso | 705/59 |
| 6,180,420 B1 | * | 1/2001 | Hintermaier et al. | 438/3 |
| 6,233,567 B1 | * | 5/2001 | Cohen | 705/59 |
| 6,330,670 B1 | * | 12/2001 | England et al. | 713/2 |

\* cited by examiner

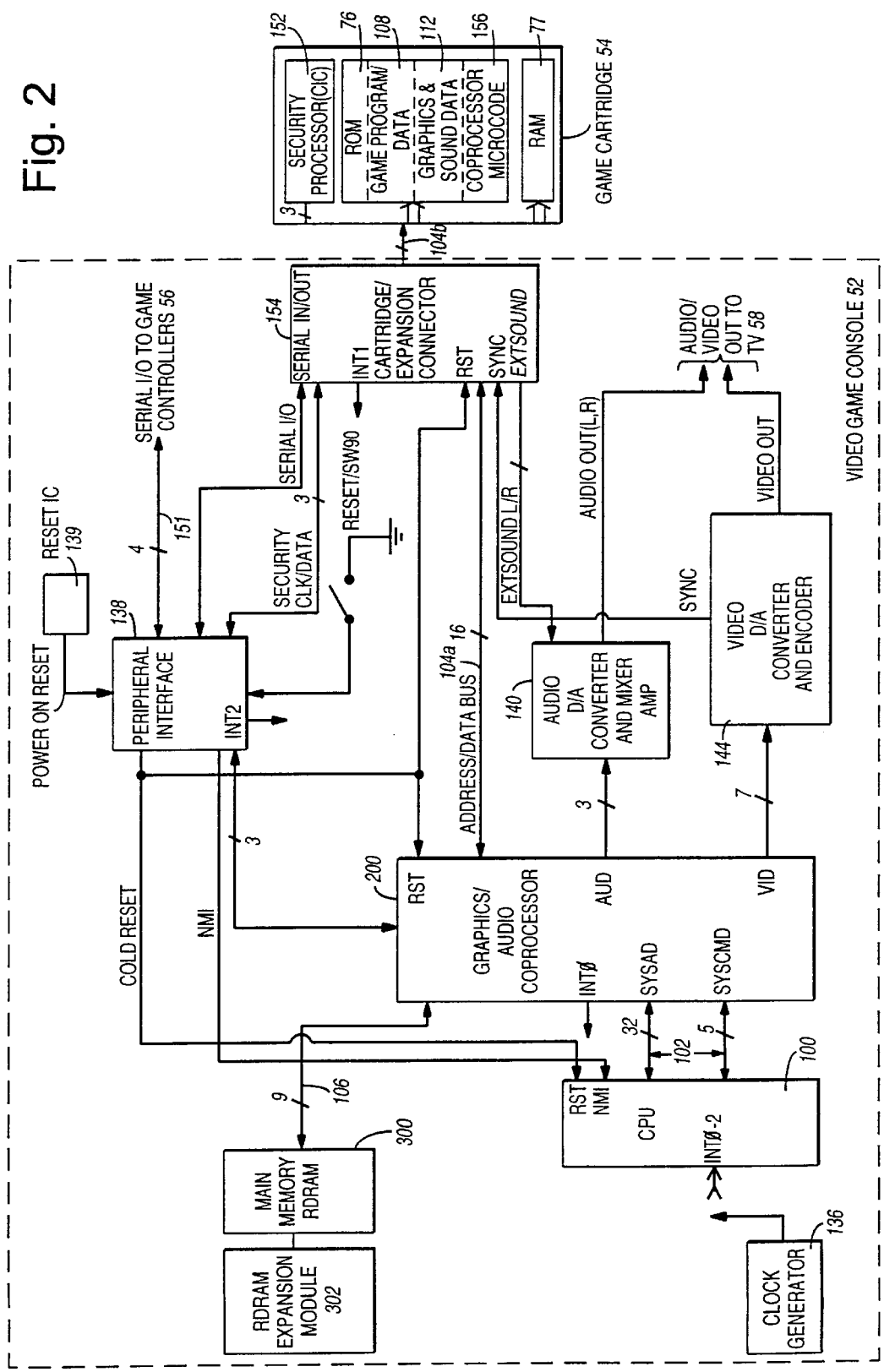

Fig. 8

| NAME | R/W | DESCRIPTION |
|---|---|---|
| DISK STATUS | R | READ: DISK STATUS |
| LBA WRITE ADDRESS | W | WRITING TO THIS ADDRESS CAUSES THE CONTENTS OF THE SECTOR BUFFER TO BE WRITTEN TO THE LBA POINTED TO BY THIS LBA WRITE ADDRESS. THE BUFFER COUNTER IS RESET. |
| LBA READ ADDRESS | W | WRITING TO THIS ADDRESS CAUSES THE CONTENTS OF THE LBA POINTED TO BY THIS LBA READ ADDRESS TO BE READ INTO THE SECTOR BUFFER. THE BUFFER COUNTER IS RESET. |
| $I^2C$ S0' OWN ADDRESS REGISTER | R/W | ES0=0 READ/WRITE: OWN ADDRESS |
| $I^2C$ S0 DATA REGISTER | R/W | ES0=1 READ/WRITE: $I^2C$ DATA |
| $I^2C$ S1 CONTROL STATUS REGISTER | R/W | READ: STATUS WRITE: CONTROL |
| $I^2C$ S2 CLOCK REGISTER | R/W | READ/WRITE: CLOCK SCALE VALUE |
| $I^2C$ S3 INTERRUPT VECTOR | R/W R | ES0=0: READ/WRITE: INTERRUPT VECTOR ES0=1: READ: INTERRUPT VECTOR ACK CYCLE |
| MODEM IN | R | READ: MODEM STATUS & DATA |
| MODEM OUT | R/W | WRITE MODEM DATA READ MODEM OUT STATUS |
| MODEM OUT CONTROL | W | SEPARATE REGISTER TO CONTROL MODEM WRITE FUNCTIONS |
| SECTOR BUFFER | R/W | 512 BYTE SECTOR BUFFER FOR THE HARD DRIVE. THE POINTER INTO THIS BUFFER IS INCREMENTED BY FOUR BYTES EACH TIME THE BUFFER IS READ OR WRITTEN. AFTER 512 BYTES ARE ACCESSED THE POINTER WRAPS AROUND. |
| VIDEO/INTERCAST SPACE | R/W | |
| INTERRUPT STATUS REGISTER | R/W | READ: EXPANSION DEVICE SUPPORTS A SINGLE, 32 BIT INTERRUPT STATUS REGISTER FOR THE VIDEO GAME SYSTEM. VARIOUS BITS WILL BE ALLOCATED TO PROCESSES AS NEEDED DURING DESIGN. WRITE: INTERRUPT MASK |
| | | |

Fig. 9

| FUNCTION | INT |
|---|---|
| MODEM DATA IN READY | Y |
| MODEM SEND READY | Y |
| RTC ALARM | Y |
| I$^2$C INTERRUPT | Y |
| INTERCAST | Y |
| DISK READ DATA READY | Y |
| DISK WRITE COMPLETED | Y |
| COUNTER AT 0 | N |

BoxIDPacket

| BoxID | Pad | Message ID | Direction Bit | Pad | Message Counter | Pad | Hash |
|---|---|---|---|---|---|---|---|
| | | | | | | | |

FIG. 15A

Delete

| BoxID | GameID | Pad | Message ID | Direction Bit | Pad | Message Counter | Pad | Hash |
|---|---|---|---|---|---|---|---|---|
| | | | | | | | | |

FIG. 15B

GamePresentPacket

| BoxID | GameID | Pad | Message ID | Direction Bit | Pad | Message Counter | Pad | Hash |
|---|---|---|---|---|---|---|---|---|
| | | | | | | | | |

FIG. 15C

GameIDsPacket

| Offset | Size | Name | Size | Name | Size | Name | Description |
|---|---|---|---|---|---|---|---|
| ... | ... | IDcount | ... | Reserved | ... | Reserved | Total gameIDs |
| ... | ... | $GameID_1$ | ... | $Status_1$ | ... | $Reserved_1$ | First gameID |
| ... | ... | ... | ... | ... | ... | ... | ... |

FIG. 15D

ContextPacket

| GameID | Success=FFh Fail=00h | Size 0 | Size 1 | Size 2 | Fill with 00f | C & R Seed for Browser, otherwise fill with 00f |
|---|---|---|---|---|---|---|

FIG. 15E

GRPacket

| BoxID | Pad | Game Code | Pad | Message ID | Direction Bit | Pad | Message Counter | Pad | Hash |
|---|---|---|---|---|---|---|---|---|---|

FIG. 15F

DLPacket

| NAME | DESCRIPTION |
|---|---|
| | HEADER |
| gameID | 0x0001 - 0xFFEF = gameID (Allocated by Manufacturer) |
| PAD | Random Padding |
| tLengthReq | Number of Chunks required for application |
| PAD | Random Padding |
| Sig | Hash of Active, protected partitions 0 & 1 |
| PAD | Random Padding |
| ResetCounter | Reset Both Counts to 0 if ResetCounter = 174 |
| PAD | Random Padding |
| | Partition 0 (ENCRYPTED PROGRAM) |
| Permissions0 | 0 = ReadOnlyEncrypted, 1 = ReadOnlyClearText |
| PAD | Random Padding |
| pLengthReq0 | Number of Chunks reserved in partition |
| pLengthUsed0 | Number of Chunks active in partition |
| PAD | Random Padding |
| | Partition 1 (READ ONLY DATA) |
| Permissions1 | 1 = ReadOnlyClearText |
| PAD | Random Padding |
| pLengthReq1 | Number of Chunks reserved in partition |
| pLengthUsed1 | Number of Chunks active in partition |
| PAD | Random Padding |
| | Partition 2 (READ/WRITE DATA) |
| Permissions2 | 2 = Read/Write ClearText |
| PAD | Random Padding |
| pLengthReq2 | Number of Chunks reserved in partition |
| pLengthUsed2 | Number of Chunks active in partition |
| PAD | Random Padding |
| | Trailer |
| PAD | Random Padding |
| BoxID | BoxID |
| PAD | Fill with random padding |
| MessageID | Message Counter |
| Direction | Set to 0 |
| Hash | Davies-Meyer check sum |

FIG. 15G

START DL PACKET

| VALUE | NAME | DESCRIPTION |
|---|---|---|
| limitedID <br> < = 8 <br> gameID | gameID <br> tLengthReq <br> Sig | HEADER <br> 0x8000 – 0xFFEF = gameID Disk (Allocated by Manufacturer) <br> Number of Chunks required for application <br> Hash of Active, protected partitions |
| 0 <br> 0 <br> 0 | Permissions0 <br> pLengthReq0 <br> pLengthUsed0 | Partition 0 (ENCRYPTED PROGRAM) <br> 1 = ReadOnlyEncrypted, 2 = ReadOnlyClearText <br> Number of Chunks reserved in partition <br> Number of Chunks active in partition |
| 1 <br> 0 <br> 0 | Permission1 <br> pLengthReq1 <br> pLengthUsed1 | Partition 1 (READ ONLY DATA) <br> 2 = ReadOnlyClearText <br> Number of Chunks reserved in partition <br> Number of Chunks active in partition |
| 2 <br> tLengthReq <br> < = tLengthReq | Permissions2 <br> pLengthReq2 <br> pLengthUsed2 | Partition 2 (READ/WRITE DATA) <br> 3 = Read/Write ClearText <br> Number of Chunks reserved in partition <br> Number of Chunks active in partition |
| gameID <br> 0 <br> FFh <br> Hash | BoxID <br> MessageID <br> Direction <br> Hash | Trailer <br> BoxID <br> Message Counter <br> Set to 0 <br> Davies-Meyer Hash |

FIG. 16

| OFFSET | SIZE | NAME | USAGE |
|---|---|---|---|
| ... | ... | GameID | |
| ... | ... | Status | (Fig. 18B) |
| ... | ... | Start Chunk 0 | |
| ... | ... | Length Chunks 0 | |
| ... | ... | Used Chunks 0 | |
| ... | ... | Start Chunk 1 | |
| ... | ... | Length Chunks 1 | |
| ... | ... | Used Chunks 1 | |
| ... | ... | Start Chunk 2 | |
| ... | ... | Length Chunks 2 | |
| ... | ... | Used Chunks 2 | |
| ... | ... | Reserved | |

FIG. 18A

| BITS | NAME | USAGE |
|---|---|---|
| 0 | Dirty | Update in process |
| 1 | Compact | Compaction in process on this partition |
| 2 | $Used_0$ | Indicates that partition 0 is used |
| 3 | $Used_1$ | Indicates that partition 1 is used |
| 4 | $Used_2$ | Indicates that partition 2 is used |
| 5 | Reserved | |
| 6 | Reserved | |
| 7 | Reserved | |

FIG. 18B

SECURITY SYSTEM FOR VIDEO GAME SYSTEM WITH HARD DISK DRIVE AND INTERNET ACCESS CAPABILITY

This application is a continuation of U.S. application Ser. No. 09/384,189, filed on Aug. 27, 1999 now U.S. Pat. No. 6,468,160, which is a continuation-in-part of U.S. application Ser. No. 09/288,293 filed Apr. 8, 1999 entitled "Home Video Game System With Hard Disk Drive and Internet Access Capability", now U.S. Pat. No. 6,599,194 which application is hereby incorporated by reference herein in its entirety.

FIELD OF THE INVENTION

The invention generally relates to a security system for a computer system having Internet access capability. More particularly, the invention relates to a security system for a home video game system enhanced to include a modem and hard disk drive which allows a video game player to dial-up a network service provider and communicate over the service provider's network to access the World Wide Web, send e-mail, play games and/or download executable programs, video and audio data to the system's hard disk drive.

BACKGROUND AND SUMMARY OF THE INVENTION

Over the years, special purpose home video game systems have been (and continue to be) immensely popular, notwithstanding the ever increasing presence of personal computers in households throughout the world. The latest generation of such dedicated video game systems utilize a user's color television to generate exciting game play involving three dimensional game worlds having striking depth and realism involving numerous animated moving objects.

For the virtual millions of game players taking advantage of such low cost, special purpose video game systems, system operation and game play has been characterized by single location, stand alone operation. While home video game systems are designed for more than one player to play using multiple controllers attached to a single video game play console, such dedicated video game systems typically do not permit game play against other remotely located players.

Video game and video game system manufacturers and developers have heretofore faced continual piracy attacks. For the most part, in cartridge-based video game systems, these attacks have come from unscrupulous counterfeiters who produce and sell illegal cartridges. Particularly for cartridge-based video game systems, end user piracy of video games has not been a major problem to combat.

In copending parent application Ser. No. 09/288,293, a system is described which advantageously converts a heretofore stand alone, special purpose video game system into a network communicating device with bulk storage capacity having numerous enhanced capabilities such as simultaneous game play video and Internet display. As used herein, the "Internet" refers to the vast collection of interconnected networks that all use the TCP/IP protocols as well as the more generic interconnection of two or more networks.

In accordance with one exemplary embodiment of the incorporated copending application, an expansion device is connected to an existing video game system port to provide additional communication and storage capability via a modem and hard disk drive. A cable TV tuner is also included in the expansion device to assist in advantageously providing a unique picture-in-picture video capability, and data acquisition from the television vertical blanking interval.

With the addition of a modem and hard drive to a home video game system, the piracy issues become dramatically more serious and complex. For example, the personal computer industry has faced rampant end user piracy and the system described herein and in copending application Ser. No. 09/288,293 is likely to face the same type of pirating attacks.

A failure to properly secure such a system, which has been commercialized in part to take advantage of its ability to download purchased games, could be commercially disastrous. If an end user could simply download games from, for example, sellers of pirated games, a significant and perhaps catastrophic revenue stream loss could result from such activity.

The present invention advantageously provides a unique, multilevel security system for use in a computer system having Internet access capability and which precludes, inter alia, downloading and execution of unauthorized programs.

In accordance with one embodiment of the present invention, the primary system security features are incorporated into a video game system expansion device having a hard disk drive. The security system does not rely on the relatively insecure video game system.

The present exemplary embodiment focuses security control in a disk drive/mass media controlling engine which is physically disposed within the expansion device housing as close as possible to the hard disk drive and the downloaded video games and other data it is designed to protect. Security features are incorporated into, for example, a disk drive controlling processing engine to provide security features which extend far beyond simplistic password systems which have heretofore been utilized in conjunction with disk drive controllers.

Security is in part controlled by a server which downloads control information to a digital processor associated with hard drive 206. The disk drive controller processor utilizes this control information to control disk partitions that are created, and to control which applications can have access to respective partitions. The relatively insecure video game system has no control over which partitions may be accessible.

The disk controller processor responds to commands from the server to set up the disk partitioning. Thus, in accordance with one embodiment of the present invention, a direct security link exists between the server and a disk drive controller resident within the expansion device. The server preferably incorporates the highest degree of available Internet security features.

In accordance with an exemplary embodiment of the present invention, each expansion device includes a unique ID associated with its mass media storage device. Unique encryption keys are advantageously for each expansion device to ensure secure communications between the expansion device and the server. Thus, when a request is made through expansion device for downloading, for example, a particular video game, the server is able to rely on the request coming from an authorized expansion device and not an unauthorized device mimicking the expansion device.

In accordance with an exemplary embodiment of the present invention, the disk controller also incorporates an encrypting engine which encrypts in accordance with a highly secure encrypting algorithm.

A further level of security is provided in the illustrative embodiments by partitioning the hard drive into various partitions whose security/accessibility is tightly controlled. Each application program, e.g., a video game, has a predetermined number of private partitions, including a read only encrypted partition, where its executable code resides, a read only data partition for holding less secure data which is not encrypted to permit faster execution since no decryption step is required, and a third partition for storing a wide range of game related data, such as a player's high score, the current location in a game.

The game downloading procedure is controlled at the server so that only authorized games are permitted to be downloaded. Each game is encrypted with an encryption key unique to each individual hard drive. The server utilizes the unique ID and encryption keys for each deck to encrypt downloaded game software. The server has a list of at least three items for each game, including the unique expansion device ID, e.g., serial number, an expansion device box encryption key, used for communications between the server and the expansion device, and a game encryption key which is utilized by the server to encrypt games for the expansion device 95. In playing a game, the server identifies to a disk controller in an expansion device 95, the disk partitions to which that particular game may have access. In accordance with the illustrative embodiments, the game program is decrypted by the disk controller encrypting engine before it may be played.

The above-described features and other advantages of the present invention will become apparent from the following detailed description of the present invention when taken in conjunction with the accompanying drawings.

BRIEF DESCRIPTION OF THE DRAWINGS

FIG. 2 is a block diagram of an exemplary embodiment of a video game console coupled to a game cartridge.

FIG. 8 is an exemplary video game system memory map.

FIG. 9 shows exemplary contents of an interrupt status register.

FIGS. 15A through 15G are exemplary data packets used in the security system described in the illustrative embodiments.

FIG. 16 is an exemplary start download packet used during the download process.

FIG. 18A is an illustration of an exemplary partition table stored in disk drive.

FIG. 18b is an associated partition table status bit table.

DETAILED DESCRIPTION OF THE PRESENT PREFERRED EMBODIMENTS

Prior to explaining the details of an exemplary embodiment of the security system of the present invention, an illustrative video game system with which the exemplary security system is designed to operate will first be explained in conjunction with FIGS. 1 through 10. The security features in accordance with various illustrative embodiments will then be explained in detail in conjunction with FIGS. 11 through 17.

Figure 1A:
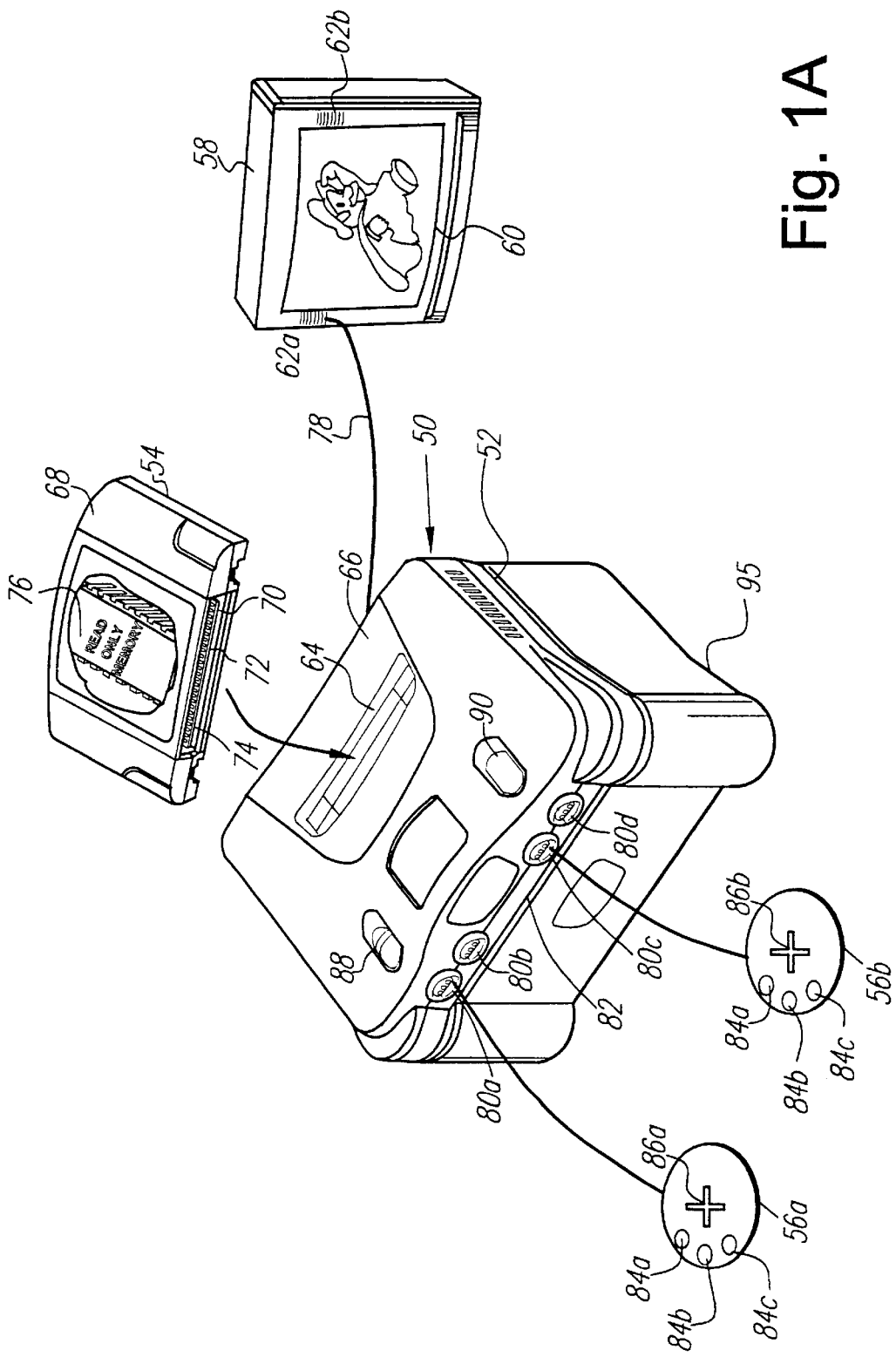
FIG. 1A is a perspective illustration of an exemplary embodiment of the present invention.

FIG. 1A is a perspective view of a presently preferred embodiment of the present invention showing an exemplary video game system 50 connected to a communications and bulk media expansion device 95. In the present exemplary embodiment, the video game system 50 may, for example, be the commercially available Nintendo 64 Video Game System. It should be recognized that the present invention is not limited to use with this exemplary video game system but rather may be adapted for use with a wide range of existing video game systems. Additionally, although the present invention is illustratively described using an add-on expansion device, it is contemplated that the enhanced video game system described herein may alternatively be packaged in a common integrated housing and sold as a single unit.

In accordance with one embodiment of the present invention, expansion device 95 is connected to an expansion port (not shown) located, for example, on the bottom housing portion of video game system 50. Even with the expansion device 95 attached to the video game 50, if a game cartridge 54 is inserted into the console 52, the system will start under control of the program resident in cartridge 54. Otherwise, it will start under control of a program resident on the hard disk drive embodied in expansion device 95 as described below.

Expansion device 95, as shown in FIG. 1A, is preferably mechanically configured to match the appearance of the video game system console 52 and includes a modem and hard disk drive, as well as many other features described in detail below. In accordance with an exemplary embodiment, expansion device 95 allows a video game player to dial up a network service provider and communicate over the service provider's network to access and surf the World Wide Web, send and receive e-mail, send real time messages and chat, play games and/or download video and/or audio information to the expansion device 95's hard disk drive. The expansion device 95 supports disk-based game play with both program and game data storage. The hard disk drive preferably has a capacity of at least one gigabyte. The modem associated with expansion device 95 should preferably be at least V.34 (33.6 baud) in performance and support caller ID, full duplex speaker phone and answering machine functions. Communication expansion device 95 is designed to be connected to external peripherals such as printers and video components and includes a cable TV tuner and video circuitry having picture-in-picture video capability and video overlay capability providing the ability to mix television video and video generated during video game play.

As shown in FIG. 1A, video game system 50 includes a main console 52, a video game storage device 54, and handheld controllers 56a,b (or other user input devices). Main console 52 is connected to a conventional home color television set 58. Television set 58 displays 3D video game images on its television screen 60 and reproduces stereo sound through its speakers 62a,b.

In the illustrative embodiment, the video game storage device 54 is in the form of a replaceable memory cartridge insertable into a slot 64 on a top surface 66 of console 52. A wide variety of alternative program storage media are contemplated by the present invention such as CD ROM, floppy disk, etc. In this exemplary embodiment, video game storage device 54 comprises a plastic housing 68 encasing a printed circuit board 70. Printed circuit board 70 has an edge 72 defining a number of electrical contacts 74. When the video game storage device 68 is inserted into main console slot 64, the cartridge electrical contacts 74 mate with corresponding "edge connector" electrical contacts within the main console. This action electrically connects the storage device printed circuit board 72 to the electronics within main console 52. In this example, at least a "read only memory" chip 76 is disposed on printed circuit board 70 within storage device housing 68. This "read only memory" chip 76 stores instructions and other information pertaining to a particular video game. The read only memory chip 76 for one game cartridge storage device 54 may, for example, contain instructions and other information for an adventure game while another storage device 54 may contain instructions and information to play a car race game, an educational game, etc. If the system is being operated using a game cartridge as opposed to via the expansion device 95, to play one game as opposed to another game, the user of video game system 50 need only plug the appropriate storage device 54 into main console slot 64—thereby connecting the storage device's read only memory chip 76 (and any other circuitry it may contain) to console 52. This enables a computer system embodied within console 52 to access the information contained within read only memory 76, which information controls the console computer system to play the appropriate video game by displaying images and reproducing sound on color television set 58 as specified under control of the read only memory game program information.

In accordance with one exemplary implementation, to set up the video game system 50 for game play, the user first connects console 52 to color television set 58 by hooking a cable 78 between the two. Console 52 produces both "video" signals and "audio" signals for controlling color television set 58. The "video" signals control the images displayed on the television screen 60 and the "audio" signals are played back as sound through television loudspeaker 62. Depending on the type of color television set 58, it may be necessary to connect a conventional "RF modulator" between console 52 and color television set 58. This "RF modulator" (not shown) converts the direct video and audio outputs of console 52 into a broadcast type television signal (e.g., for a television channel 2 or 3) that can be received and processed using the television set's internal "tuner." Other conventional color television sets 58 have direct video and audio input jacks-and therefore don't need this intermediary RF modulator.

The user then needs to connect console 52 to a power source. This power source may comprise a conventional AC adapter (not shown) that plugs into a standard home electrical wall socket and converts the house voltage into a lower voltage DC signal suitable for powering console 52. The user may then connect up to 4 hand controllers 56a, 56b to corresponding connectors 80a–80d on main unit front panel 82.

Controllers 56 may take a variety of forms and the controller depicted in FIG. 1A is only for illustrative purposes only. In this example, the controllers 56a,b include various function controlling push buttons such as 84a–c and X–Y switches 86a,b used, for example, to specify the direction (up, down, left or right) that a player controllable character displayed on television screen 60 should move. Other controller possibilities include joysticks, mice pointer controls, a keyboard, and a wide range of other conventional user input devices. The presently preferred controller for use in system 50 is disclosed in FIGS. 6 through 7 of the applicants' assignee's copending application Ser. No. 08/719,019, entitled "Operation Controlling Device and Video Processing System Used Therewith", which application is incorporated herein by reference in its entirety.

The video game system 50 is designed to accommodate expansion to incorporate various types of peripheral devices yet to be specified. This is accomplished by incorporating a programmable peripheral device input/output system which permits device type and status to be specified by program commands.

In the cartridge based mode of operation, a user selects a storage device 54 containing a desired video game, and inserts that storage device into console slot 64 (thereby electrically connecting read only memory 76 and other cartridge electronics to the main console electronics). The user then operates a power switch 88 to turn on the video game system 50 and operates controllers 86a,b (depending on the particular video game being played, up to four controllers for four different players can be used with the illustrative console) to provide inputs to console 52 and thus control video game play. For example, depressing one of push buttons 84a–c may cause the game to start playing. Moving directional switch 86 may cause animated characters to move on the television screen 60 in controllably different directions. Depending upon the particular video game stored within the storage device 54, these various controls 84, 86 on the controller 56 can perform different functions at different times. If the user wants to restart game play from the beginning, or alternatively with certain game programs reset the game to a known continuation point, the user can press a reset button 90.

Figure 1B:
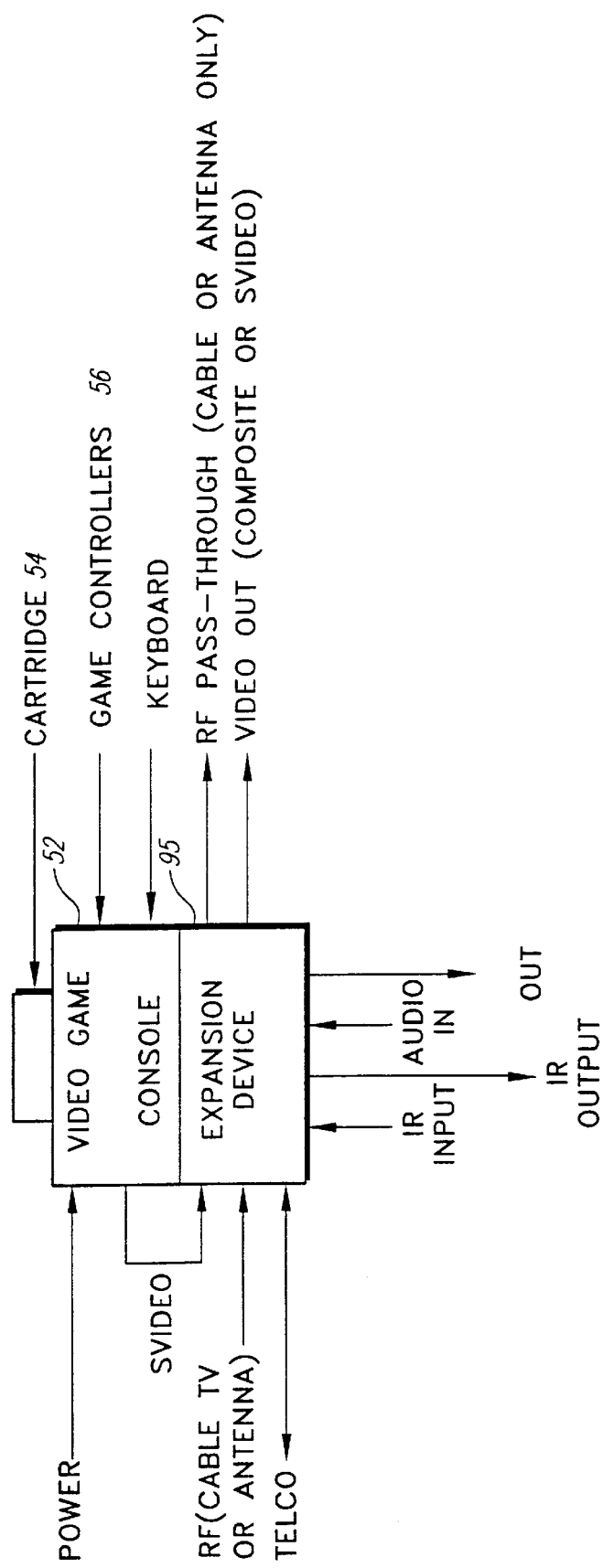
FIG. 1B is a block diagram of part of FIG. 1A.

FIG. 1B schematically shows the input and output signals associated with video game console 52 and expansion device 95. Expansion device 95 is coupled to a video console 52 expansion connector, which preferably is the mirror image of the cartridge connector bus such as exemplary embodiment cartridge connector 154 shown in FIG. 2. As is described further below, expansion device 95 includes a hard drive, a video section with a TV tuner, and a modem.

Expansion device 95 receives the highest quality video output signal from video game console 52 (SVIDEO). In the alternative embodiment, where the expansion device and video game system are combined as an integrated unit, the signal from the video game system would be a digital RGB signal instead of an SVIDEO signal. TV signals are coupled to the expansion device 95 via the RF input from either cable TV or off-air signals or via baseband. These RF or baseband signals are blended with the output signals from the video game console 52. In this fashion, a user may watch TV while viewing overlay information from the video game console. RF data may be delivered via the RF input and captured during the video vertical blanking interval if desired.

Video game console 52, as shown in FIGS. 1A, 1B, and 2, is coupled to game controllers 56. In accordance with one embodiment of the present invention, Internet operations may be controlled via a game controller 56 as shown in the above-identified application Ser. No. 08/719,019. However, a preferred Internet access input device is a keyboard which permits convenient text entry operations. A wired keyboard may, for example, be coupled to one of the controller ports 80A–80D shown in FIG. 1A and will preferably interface with the same control logic as a game controller 86. Alternatively, a wireless infrared keyboard or the like could be used as a text entry device.

The expansion device 95 includes a RF pass-through output which operates to pass the TV signal from expansion device 95 to, for example, a user's TV or VCR. Expansion device 95 also includes a video output which feeds either a composite video output signal or SVIDEO output signal and includes an input/output connection to the telephone system which is coupled to a modem within expansion device 95.

As shown in FIG. 1B, expansion device 95 includes an audio input which permits, for example, interconnection with a microphone. The microphone permits taking advantage of the DSVD capabilities of the expansion device modem. In this context, the modem mixes data coming from the video game console 52 and input audio information. The microphone may be used for voice input which may be digitized for use in a game. The audio input also permits the input of other audio information which may then be digitized and coupled to video game console 52 for use in a game. Alternatively, the input audio information may be directly coupled to an associated speaker. Expansion device 95 also includes an audio output that may be directly coupled to the user's TV and/or a headset.

Expansion device 95 also includes infrared IR control. Infrared input signal processing, for example, permits a TV tuner within expansion device 95 to be remotely controlled via the IR input signal. The IR controller may be linked to the TV tuner after IR information is processed in the video game console 52, or alternatively the information may be processed by an IR control CPU in expansion device 95. The IR output is used to control an associated cable box that may be coupled to the RF input described above. Thus the IR output may be used to change channels via an associated cable box. The IR output may, for example, be used to remotely control the TV power or to control recording in an associated VCR. The television power may be controlled, for example, by a user depressing the "Power" button on a hand-held IR remote. The IR signal is sent to the expansion device 95 IR input. The expansion device 95 sends this information to the video game console 52. The video game console 52 recognizes this as a "Power" button depression. It then commands the expansion device 95 to output the IR signal to the TV that commands the TV to toggle its power. The overall system is powered via a power input from game. console 52.

In accordance with another exemplary embodiment, the IR output may control both a cable box and a VCR at the same time. For example, two IR LEDs may be placed on a single output. One IR LED could be placed next to the VCR, the other next to the cable box. The signal generated by the expansion device 95 causes both LEDs to flash at the same time with the same signal. The cable box sees transmissions intended for the VCR, and the VCR sees transmissions intended for the cable box, but since each device is programmed to respond only to its own unique set of signals, one device will ignore the signals intended for the other device. In this way, two devices may be controlled with the same signal output. Another device which may be controlled by the IR output is a Direct Broadcast Satellite box.

The system shown in FIG. 1B permits a user to receive enhanced television services. For example, a TV channel guide may be downloaded via the Internet, allowing a user to spot a desired program and to immediately tune to the program via the expansion device TV tuner and IR input. The IR signal may be coupled to the cable box, a Direct Broadcast Satellite Box, or a VCR. The TV channel guide may be captured from data transmitted in the vertical blanking interval of a television signal. In one exemplary embodiment, the signal from a remote controller is not directly linked to the IR transmitter. The video game console 52 first interprets the IR signal, then remaps the signal to the device to be controlled via the IR transmitter.

The system shown in FIG. 1B also permits a user to watch TV while simultaneously logging onto the Internet. This feature advantageously allows a user to observe his or her favorite news, sports or entertainment show while waiting for Internet access. Expansion device 95 permits the video game console 52 to be coupled to the Internet to play multiplayer games, or alternatively, to dial a friend and play a game involving head-to-head competition.

Expansion device 95 also provides video game console 52 with a mass storage device (such as a hard drive) to permit the downloading of entire games onto the mass storage device. The purpose of the mass storage device is not only for downloading entire games, but also for caching of internet data to permit user-friendly viewing of internet pages. It is also for storing downloaded upgrades of games, additional levels of games, and non-game data such as text files.

If the system is used with a game cartridge 54, game cartridge 54 may be programmed to utilize the expansion device modem and mass storage device. Alternatively, in one embodiment of the present invention, the system shown in FIG. 1B may be operated without a cartridge 54.

Figure 1C:
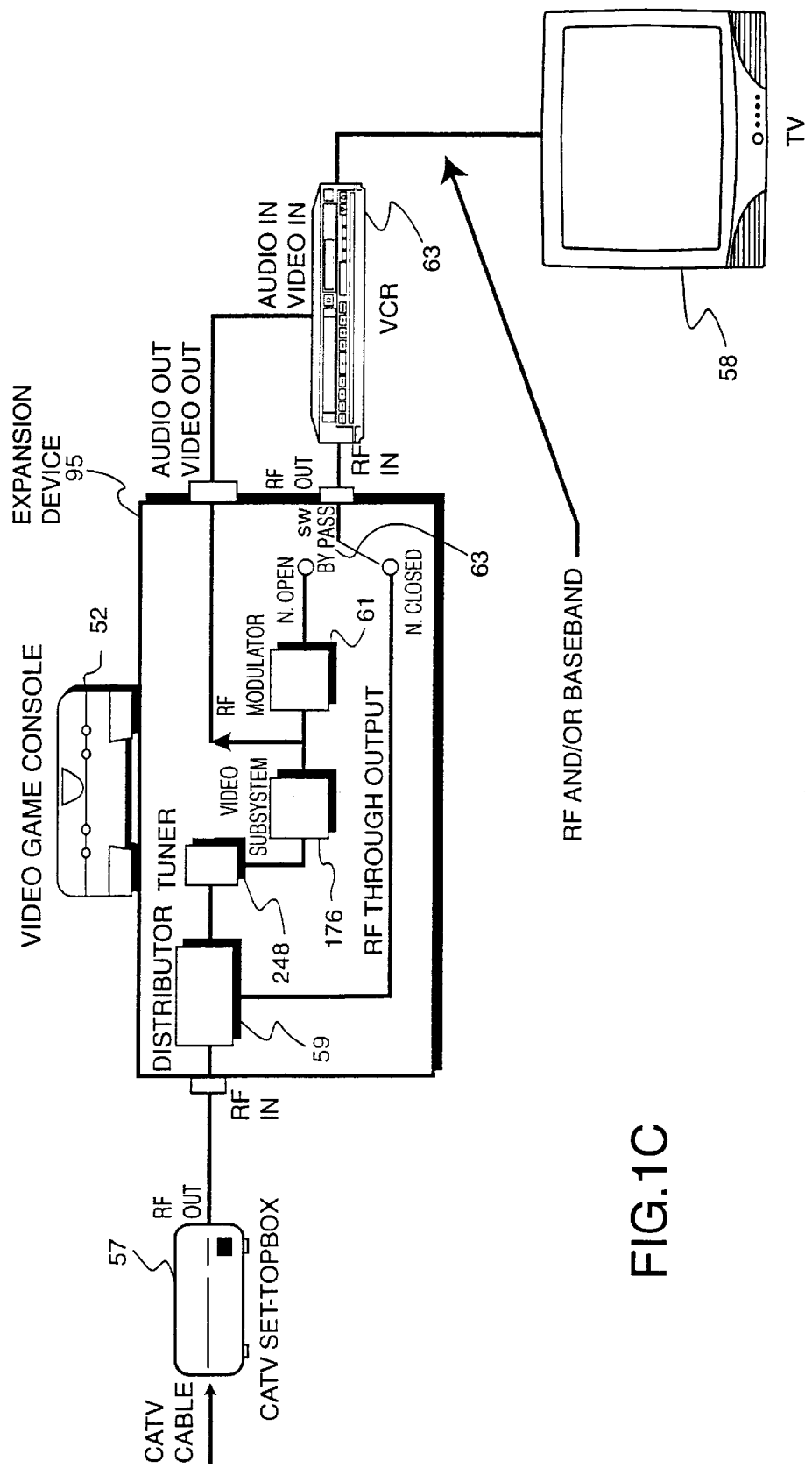
FIG. 1C is an illustrative component interconnection diagram showing an exemplary embodiment of the present invention in a home video game system context.

FIG. 1C is an illustrative component interconnection diagram showing an exemplary embodiment of the present invention in a home video game system context. As shown in FIG. 1C, a television signal is transmitted to a cable TV box 57, which outputs, for example, a broadband output signal that is coupled to the RF input of expansion device 95. The cable TV box 57 may alternatively be a Direct Satellite Broadcast box, or a broadcast TV antenna. Expansion device 95 is also coupled to video game system console 52 as shown in FIGS. 1A and 1B.

The input broadband TV signal is split by distributor 59 such that the RF signal is in one path input to tuner 248 and in another path is passed through to bypass switch 63. Tuner 248 provides a demodulated baseband signal, which is coupled to the video subsystem 176. The video subsystem output is modulated by RF modulator 61 to a broadband signal, and the broadband signal is coupled to bypass switch 63.

Bypass switch 63 is normally in a closed position to provide a bypass path for the input RF signal. Bypass switch 63 provides a bypass path during power down conditions or otherwise switches is response to a switching control signal. Bypass switch 63 is switched to the open position in response to a control signal (for example, received via the I²C bus described below in conjunction with FIG. 5A) under program control. Thus, when the system powers down, or in a default condition, an RF output is always coupled to the expansion device 95 output. Alternatively, the bypass switch 63 may be controlled to output signals generated by the video subsystem 176, such as, for example, a picture-in-picture display as will be described in detail below via the audio/video output of expansion device 95.

As shown in FIG. 1C, the baseband video subsystem 176 output and the RF output signal are coupled to respective inputs of the VCR 163. The RF and/or baseband outputs of VCR 63 are coupled to a user's home television 58. As described above in conjunction with FIG. 1B, expansion device 95 also outputs an IR output signal.

Prior to describing further details of expansion device 95, the video game system 50 will be described in conjunction with FIG. 2, which is a block diagram of an illustrative embodiment of console 52 coupled to a game cartridge 54. FIG. 2 shows a main processor 100, a coprocessor 200, and main memory 300 which may include an RDRAM expansion module 302. For a more complete description of the video game system shown in FIG. 2, including details of the peripheral interface 138 and other components, reference is made to the applicants' assignee's copending application Ser. No. 08/562,288, entitled "High Performance/Low Cost, Video Game System With Multifunctional Peripheral Processing Subsystem", which application is incorporated herein by reference in its entirety.

Main processor 100 is the computer that executes the video game program within storage device 54 in conjunction with coprocessor 200. In this example, the main processor 100 accesses this video game program through the coprocessor 200 over a communication path 102 between the main processor and the coprocessor 200, and over another communication path 104a,b between the coprocessor and the video game storage device 54. Alternatively, the main processor 100 can control the coprocessor 200 to copy the video game program from the video game storage device 54 into main memory 300 over path 106, and the main processor 100 can then access the video game program in main memory 300 via coprocessor 200 and paths 102, 106. Main processor 100 accepts inputs from game controllers 56 during the execution of the video game program.

Main processor 100 generates, from time to time, lists of instructions for the coprocessor 200 to perform. Coprocessor 200 may be any compatible coprocessor which supports rapid processing of 3D graphics and digital audio or it may be a special purpose high performance, application specific integrated circuit having an internal design that is optimized for rapidly processing 3D graphics and digital audio information. In response to instruction lists provided by main processor 100 over path 102, coprocessor 200 generates video and audio outputs for application to color television set 58 based on data stored within main memory 300 and/or video game storage device 54.

FIG. 2 also shows that the audio video outputs of coprocessor 200 are not provided directly to television set 58 in this example, but are instead further processed by external electronics outside of the coprocessor. In particular, in this example, coprocessor 200 outputs its audio and video information in digital form, but conventional home color television sets 58 require analog audio and video signals. Therefore, the digital outputs of coprocessor 200 must be converted into analog form—a function performed for the audio information by DAC and mixer amp 40 and for the video information by VDAC and encoder 144. The analog audio signals generated in DAC 140 are amplified and filtered by an audio amplifier therein that may also mix audio signals generated externally of console 52 via the EXT-SOUND L/R signal from connector 154. The analog video signals generated in VDAC 144 are provided to a video encoder therein which may, for example, convert "RGB" inputs to composite video outputs compatible with commercial TV sets. The amplified stereo audio output of the amplifier in ADAC and mixer amp 140 and the composite video output of video DAC and encoder 144 are provided to directly control home color television set 58. The composite synchronization signal generated by the video digital to analog converter in component 144 is coupled to its video encoder and to external connector 154 for use, for example, by an optional light pen or photogun.

FIG. 2 also shows a clock generator 136 that produces timing signals to time and synchronize the other console 52 components. Different console components require different clocking frequencies, and clock generator 136 provides suitable such clock frequency outputs (or frequencies from which suitable clock frequencies can be derived such as by dividing).

In this illustrative embodiment, game controllers 56 are not connected directly to main processor 100, but instead are connected to console 52 through serial peripheral interface 138. Serial peripheral interface 138 demultiplexes serial data signals incoming from up to four or five game controllers 56 (e.g., 4 controllers from serial I/O bus 151 and 1 controller from connector 154) and provides this data in a predetermined format to main processor 100 via coprocessor 200. Serial peripheral interface 138 is bidirectional, i.e., it is capable of transmitting serial information specified by main processor 100 out of front panel connectors 80a–d in addition to receiving serial information from those front panel connectors. The serial interface 138 receives main memory RDRAM data, clock signals, commands and sends data/responses via a coprocessor serial interface (not shown). I/O commands are transmitted to the serial interface 138 for execution by its internal processor as is described in copending application Ser. No. 08/562,288. In this fashion, the peripheral interface's processor by handling I/O tasks, reduces the processing burden on main processor 100. As is described in more detail in application Ser. No. 08/562,288, serial peripheral interface 138 also includes a "boot ROM (read only memory)" that stores a small amount of initial program load (IPL) code. This IPL code stored within the peripheral interface boot ROM is executed by main processor 100 at time of startup and/or reset to allow the main processor to begin executing game program instructions 108 within storage device 54. The initial game program instructions 108 may, in turn, control main processor 100 to initialize the drivers and controllers it needs to access main memory 300.

In this exemplary embodiment when operating in the cartridge game play mode, serial peripheral interface 138 includes a processor (not shown) which, in addition to performing the I/O tasks referred to above, also communicates with an associated security processor 152 within storage device 54 and performs security tasks. This pair of security processors (one in the storage device 54, the other in the console 52) performs, in cooperation with main processor 100, an authentication function to ensure that only authorized storage devices may be used with video game console 52.

As shown in FIG. 2, peripheral interface 138 receives a power-on reset signal from reset IC 139. Reset IC 139 detects an appropriate threshold voltage level and thereafter generates a power-on reset signal which, in turn, results in a cold reset signal being generated, which signal is coupled to the reset input of main processor 100.

FIG. 2 also shows a connector 154 within video game console 52. In this illustrative embodiment, connector 154 connects, in use, to the electrical contacts 74 at the edge 72 of storage device printed circuit board 70. Thus, connector 154 electrically connects coprocessor 200 to storage device ROM 76. Additionally, connector 154 connects the storage device security processor 152 to main unit serial peripheral interface 138. Although connector 154 in the particular example shown in FIG. 2 may be used primarily to read data and instructions from a non-writable read only memory 76, system 52 is designed so that the connector is bidirectional, i.e., the main unit can send information to the storage device 54 for storage in random access memory 77 in addition to reading information from it.

Main memory 300 stores the video game program in the form of CPU instructions 108. All accesses to main memory 300 are through coprocessor 200 over path 106. These CPU instructions are typically copied from the game program/data 108 stored in storage device 54 and downloaded to RDRAM 300. This architecture is likewise readily adaptable for use with CD ROM or other bulk media devices. Although CPU 100 is capable of executing instructions directly out of storage device ROM 76, the amount of time required to access each instruction from the ROM is much greater than the time required to access instructions from main memory 300. Therefore, main processor 100 typically copies the game program/data 108 from ROM 76 into main memory 300 on an as-needed basis in blocks, and accesses the main memory 300 in order to actually execute the instructions. Memory RD RAM 300 is preferably a fast access dynamic RAM capable of achieving 500 Mbytes/second access times such as the DRAM sold by RAMBUS, Inc. The memory 300 is coupled to coprocessor 200 via a unified nine bit wide bus 106, the control of which is arbitrated by coprocessor 200. The memory 300 is expandable by merely plugging, for example, an 8 Mbyte memory card into console 52 via a console memory expansion port (not shown).

The main processor 100 preferably includes an internal cache memory (not shown) used to further decrease instruction access time. Storage device 54 also stores a database of graphics and sound data 112 needed to provide the graphics and sound of the particular video game. Main processor 100, in general, reads the graphics and sound data 112 from storage device 54 on an as-needed basis and stores it into main memory 300 in the form of texture data, sound data and graphics data. In this example, coprocessor 200 includes a display processor having an internal texture memory into which texture data is copied on an as-needed basis for use by the display processor.

Storage device 54 also stores coprocessor microcode 156. In this example, a signal processor within coprocessor 200 executes a computer program in order to perform its various graphics and audio functions. This computer program, called the "microcode," is provided by storage device 54. Typically, main processor 100 copies the microcode 156 into main memory 300 at the time of system startup, and then controls the signal processor to copy parts of the microcode on an as-needed basis into an instruction memory within signal processor for execution. Because the microcode 156 is provided by storage device 54, different storage devices can provide different microcodes—thereby tailoring the particular functions provided by coprocessor 200 under software control. Because the microcode 156 is typically too large to fit into the signal processor's internal instruction memory all at once, different microcode pages or portions may need to be loaded from main memory 300 into the signal processor's instruction memory as needed. For example, one part of the microcode 156 may be loaded into signal processor 400 for graphics processing, and another part of microcode may be loaded for audio processing.

Although not shown in FIG. 2, coprocessor 200 also includes a CPU interface, a serial interface, a parallel peripheral interface, an audio interface, a video interface, a main memory DRAM controller/interface, a main internal bus and timing control circuitry. The coprocessor main bus allows each of the various main components within coprocessor 200 to communicate with one another. The CPU interface is the gateway between main processor 100 and coprocessor 200. Main processor 100 reads data to and writes data from coprocessor CPU interface via a CPU-to-coprocessor bus. A coprocessor serial interface provides an interface between the serial peripheral interface 138 and coprocessor 200, while coprocessor parallel peripheral interface 206 interfaces with the storage device 54 or other parallel devices connected to connector 154.

A coprocessor audio interface reads information from an audio buffer within main memory 300 and outputs it to audio DAC 140. Similarly, a coprocessor video interface reads information from an RDRAM frame buffer and then outputs it to video DAC 144. A coprocessor DRAM controller/interface is the gateway through which coprocessor 200 accesses main memory 300. The coprocessor timing circuitry receives clocking signals from clock generator 136 and distributes them (after appropriate dividing as necessary) to various other circuits within coprocessor 200.

Main processor 100 in this example is a MIPS R4300 RISC microprocessor designed by MIPS Technologies, Inc., Mountain View, Calif. For more information on main processor 100, see, for example, Heinrich, MIPS Microprocessor R4000 User's Manual (MIPS Technologies, Inc., 1984, Second Ed.). The conventional R4300 main processor 100 supports six hardware interrupts, one internal (timer) interrupt, two software interrupts, and one non-maskable interrupt (NM). In this example, three of the six hardware interrupt inputs (INT0, INT1 and INT2) and the non-maskable interrupt (NMI) input allow other portions of system 50 to interrupt the main processor. Specifically, main processor INT0 is connected to allow coprocessor 200 to interrupt the main processor, the main processor interrupt INT1 is connected to allow storage device 54 or other external devices to interrupt the main processor, and main processor interrupts INT2 and NMI are connected to allow the serial peripheral interface 138 to interrupt the main processor. Any time the processor is interrupted, it looks at an internal interrupt register to determine the cause of the interrupt and then may respond in an appropriate manner (e.g., to read a status register or perform other appropriate action). All but the NMI interrupt input from serial peripheral interface 138 are maskable (i.e., the main processor 100 can selectively enable and disable them under software control).

Figure 3:
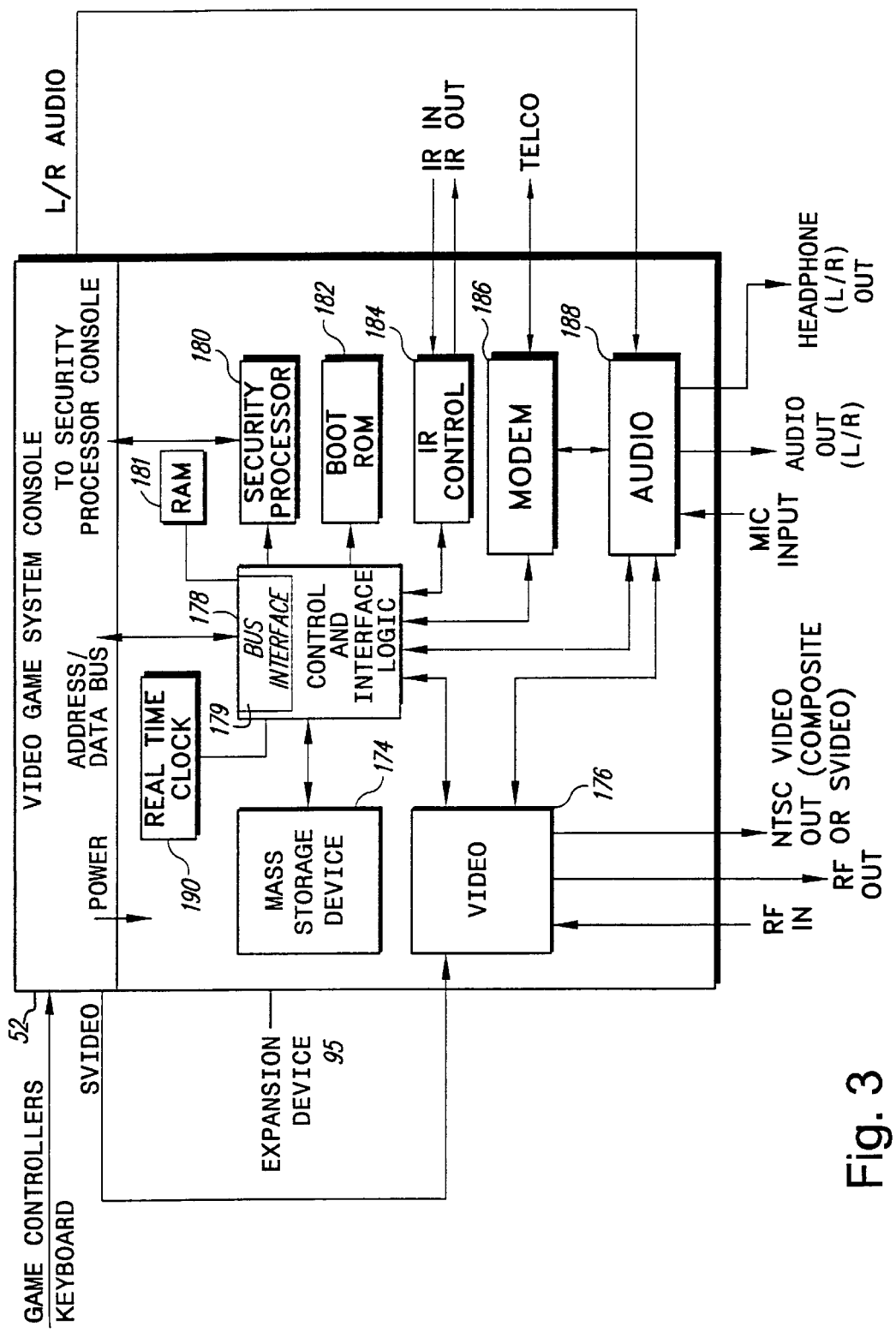
FIG. 3 is a block diagram of the system shown in FIGS. 1A and 1B showing the expansion device in further detail.

FIG. 3 is a block diagram similar to FIG. 1B but shows the expansion device 95 in further detail. Data and control signals are coupled from video game console 52's address and data (address/data) bus to the expansion device 95 and from expansion device 95 to video game console 52 via control interface logic 178. Thus, each of the internal integrated circuits in the expansion device 95 are controlled by the main processor (CPU) 100 in the console 52 through the control interface logic component 178.

FIG. 3 shows a keyboard and game controllers connected to the video game console 52. In accordance with one embodiment of the present invention, the wired keyboard connection may be replaced by, for example, an infrared wireless keyboard link. The keyboard data may be input via the RF input to video circuitry 176.

Control and interface logic 178, which may be implemented in a variety of different ways, includes the control and video game system interface logic for expansion device components including mass storage device 174, video circuitry 176, modem 186, and audio circuitry 188. In the security system embodiment described and claimed herein, control and interface logic 178 is implemented to include the media engine related components shown and described in conjunction with FIG. 13 which will be explained in detail below.

In accordance with an exemplary embodiment of the present invention, control and interface logic 178 includes a bus interface 179 for controlling communication over the address/data bus of the video game system shown in FIG. 3. Bus interface 179 receives direct memory access (DMA) read/write commands over the video game system console's address/data bus and responds to such commands by supplying the requested data or by transferring data to an identified component. Thus, large data blocks may be transferred by control and interface logic 178 in DMA mode to, for example, mass storage device 174. The control and interface logic 178 receives a DMA request with appropriate addresses and transfers data between the video game console and expansion device 95 in response to read or write clock signals. Data is typically obtained by control and interface logic 178 from RAM 181, boot ROM 182, mass storage device 174 and transferred to the video game console main memory RD RAM 300 (FIG. 2).

The expansion device 95 also includes an audio section 188 controlled by control and interface logic 178. The audio circuitry 188 receives and may, for example, be utilized to mix the left and right audio received from video game console 52 with the audio output of the tuner resident in the video section 176. The audio section 188 receives audio information from a microphone input, digitizes such audio input and, for example, may couple such audio information to the video game system console 52. Audio section 188 includes an audio output (L/R) and a headphone audio output (L/R).

Expansion device 95 also includes a modem 186 which is controlled by control and interface logic 178. Data and control signals may be coupled to and from modem 186 and, for example, video game console 52 via control and interface logic 178. Modem 186 is coupled to audio section 188 to permit voice data to be input and output to the modem. As is conventional, modem 186 interfaces with the telephone line for receiving and transmitting information. Modem 186 may, for example, be any of a wide range of modems such as a V.34 or V.90 telephone modem, an ADSL modem, a cable modem, or, wireless modem.

Control and Interface logic 178 may additionally include a digital signal processor (DSP) and an associated first in, first out (FIFO) stack for use in controlling modem 186. Modem 186 requires hand-shaking operations for data exchange which is controlled by the digital signal processor. The FIFO buffers data communicated to and from modem 186. The modem DSP interrupts the video game console 52 via the console's control and status registers to inform the video game console 52 that modem data is ready for processing.

Control and interface logic 178 is also coupled to RAM 181. RAM 181 provides buffer space for incoming modem data and disk sectors, for example, from mass storage device 174 during read/write operations.

Mass storage device 174 is preferably a fixed hard disk drive, but may, for example, be a removable hard disk drive. The storage device 174 may alternatively be some other high-capacity media such as Digital Versatile Disc (DVD) RAM. Alternatively, mass storage device may be implemented by a high capacity floppy disk or high capacity flash memory module. Mass storage device 174 stores a network browser program, the expansion device operating system, and all expansion device application programs. Mass storage device 174 also stores information downloaded to expansion device 95 from the Internet, such as, for example, video games and other application programs. Mass storage device 174 is controlled by an associated disk controller in control and interface logic 178 which receives control signals from the video game console 52 address/data bus.

Both the disk controller and modem controller, for example, have access to the same video game system 52 RAM/ROM space to form a unified memory structure. In an exemplary embodiment, both controllers share the memory resources and transfer memory between each other and transfer data to the video game system host. The memory subsystem requires a minimum bandwidth that is high enough to support concurrent access for all systems that have memory access. This combined architecture allows for flexible buffer schemes such as FIFOs and LIFOs. As indicated above, data may be downloaded directly to disk 174 without any host CPU action through DMA operation. Tasks may also be distributed across different processors using the unified memory scheme shown in FIG. 2. To permit the disk controller and modem controller to have concurrent access to RDRAM 300, a time multiplexed access scheme may be utilized. For example, each of the controllers may be assigned a time slice for reading from and writing to RDRAM 300. The memory speed needs to be sufficiently high enough so that concurrent access for all systems requiring memory access may be accomplished.

Control and interface logic 178 receives and couples control information from the console 52 address/data bus to video circuitry 176 such as, for example, size information for picture-in-picture displays, overlay information, and information for changing the expansion device tuner channel. The video section 176 transfers video information to, for example, video game system console 52 via the control interface and logic section 178. In this fashion, an image may be captured from the video RF input and forwarded to the video game console via the address/data bus. Intercast data carried in the vertical and/or horizontal blanking intervals may bidirectionally flow between the control interface logic 178 and video game system console 52 for a variety of purposes. In accordance with one exemplary embodiment, antipiracy features may be built into the system by monitoring the vertical blanking interval data received via the video signal and reinserting data at the output of the signal designed to prevent pirating.

Intercast data in the form of HTML information may be fed to the video game system console which forwards such information to an associated browser stored in mass storage device 174. Alternatively, program TV guide information may be fed to the video game system console. In this fashion, TV guide information received over the Internet may in turn be stored in mass storage device 174 as the current TV guide. If a TV guide application program is resident in mass storage device 174, the current TV guide information will be utilizable by the user to, for example, identify and tune to a desired television program.

Expansion device 95 additionally includes infrared control circuitry 184 for receiving infrared input and coupling such infrared input to control and interface logic 178, which, in turn, couples such information to video game system console 52 or to video circuitry 176 for changing the TV channel via the tuner embodied in the video section 176 or via an IR transmitter. Thus, channel changing may occur under the control of control and interface logic 178 and the video section 176 tuner, even if the video game system console is in the process of controlling game play. Alternatively, the remote infrared control input may be utilized to change the TV channel under the control of the video game system console. During game play, a channel may be changed, for example, in picture-in-picture mode under the control of the expansion device's control and interface logic 178 and the video section's tuner. The infrared output is utilized, for example, to control via video game console 52's processor, channel changing of an external device, such as a cable box or VCR.

Boot ROM 182 is utilized during system startup and stores information for generating initial screen and other initialization data. Boot ROM 182 may also include system diagnostic software to, for example, ensure that mass storage device 174 is operational on startup. Boot ROM 182 will initiate processing from the program that is stored in a prescribed address of ROM 76 in the game cartridge 54 when the game cartridge 54 is attached to the console 52; and it will initiate processing from the program that is stored at a prescribed address of the hard disk 174 when the game cartridge 54 is not attached to the console 52. In accordance with an exemplary embodiment, when the game cartridge 54 is attached, the game cartridge 54 is given priority. Thus, by using a boot-strap ROM that stores the startup program, the system can be started by giving the program in the cartridge priority, and thereby starting the program in accordance with the program stored in the cartridge ROM when a cartridge is attached to the video game device; and in accordance with a program stored in the hard disk when no cartridge is attached.

Expansion device 95 also includes a security processor 180. Exemplary security operations performed in accordance with an illustrative embodiment of the present invention are described further below. As indicated above, serial peripheral interface 138 in FIG. 2 includes a processor which performs security tasks and which communicates with security processor 180. This pair of security processors each perform an authentication/security check. If the authentication/security check is not successful, the system is held in a reset state.

Expansion device 95 also includes a real time clock 190. The real time clock is used to maintain time and date information, which may, for example, be used during security processing.

Figure 4:
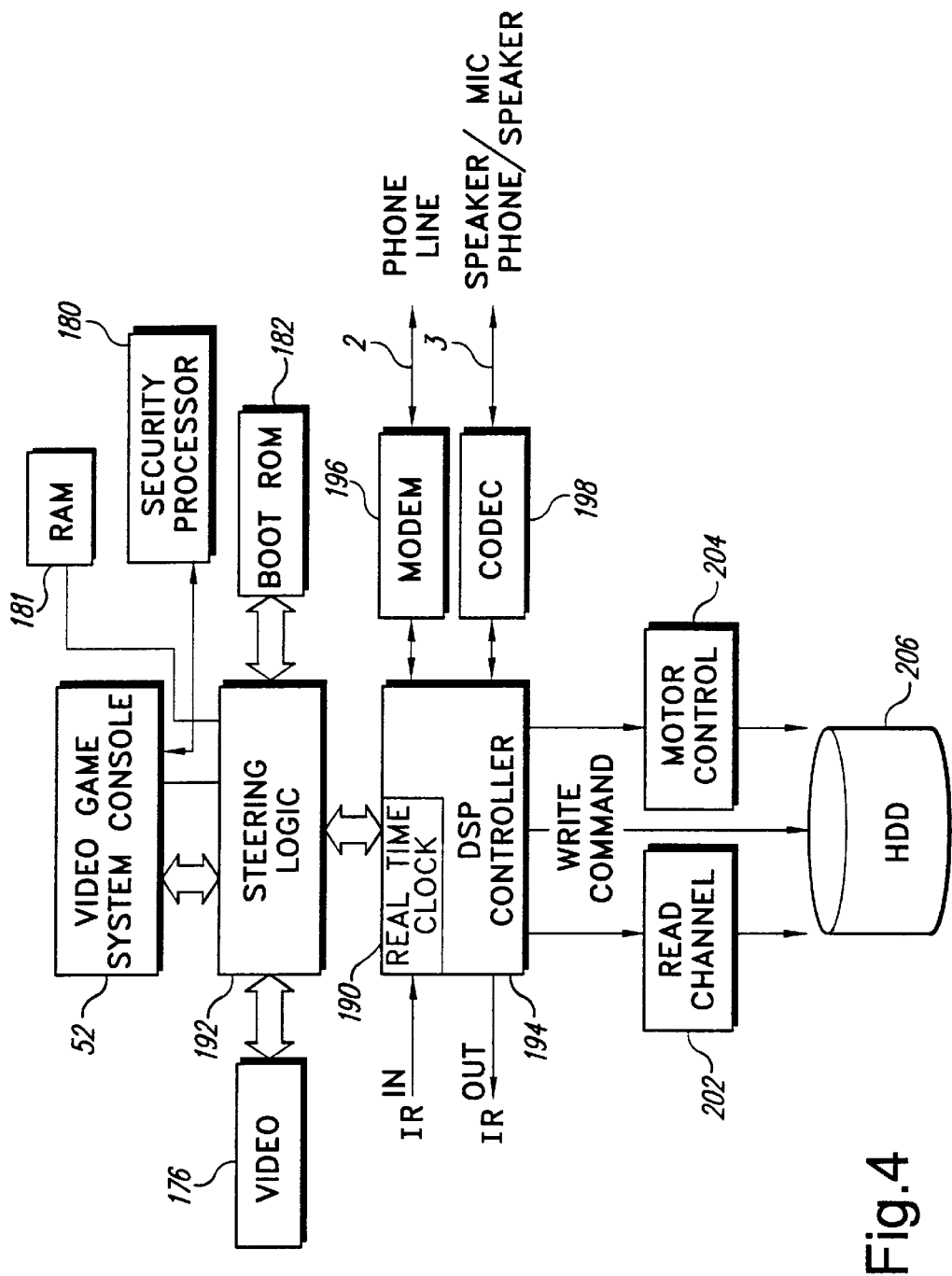
FIG. 4 is a more detailed block diagram of the expansion device shown in FIG. 3 depicting a preferred integrated modem and mass storage device control.

FIG. 4 is a further block diagram of an exemplary expansion device 95 embodiment depicting shared integrated control for the modem and mass storage device. As represented in FIG. 4, the digital signal processor (DSP) based controller 194 utilized to control hard drive 206 is also utilized to control modem 196. Modem 196, which is utilized to interface with the phone lines, codec 198, which interfaces with the speaker phone and microphone I/O lines, read channel control 202, motor control 204 and the write command input associated with hard drive 206 are each coupled to DSP controller 194. The DSP controller 194 includes a real time clock 190 as well as input and output for infrared control.

DSP controller 194 communicates with the video section 176 and the video game console 52 via steering logic 192. Steering logic 192 may, for example, receive address information designating the appropriate destination for transmitted information. Steering logic 192 is also coupled to boot ROM 182 shown and previously described in conjunction with FIG. 3. Security processor 180 is coupled directly to video game console 52.

The control system represented in FIG. 4 advantageously utilizes the mass storage device DSP controller to multitask to control both modem 196 and hard drive 206.

Figure 5A:
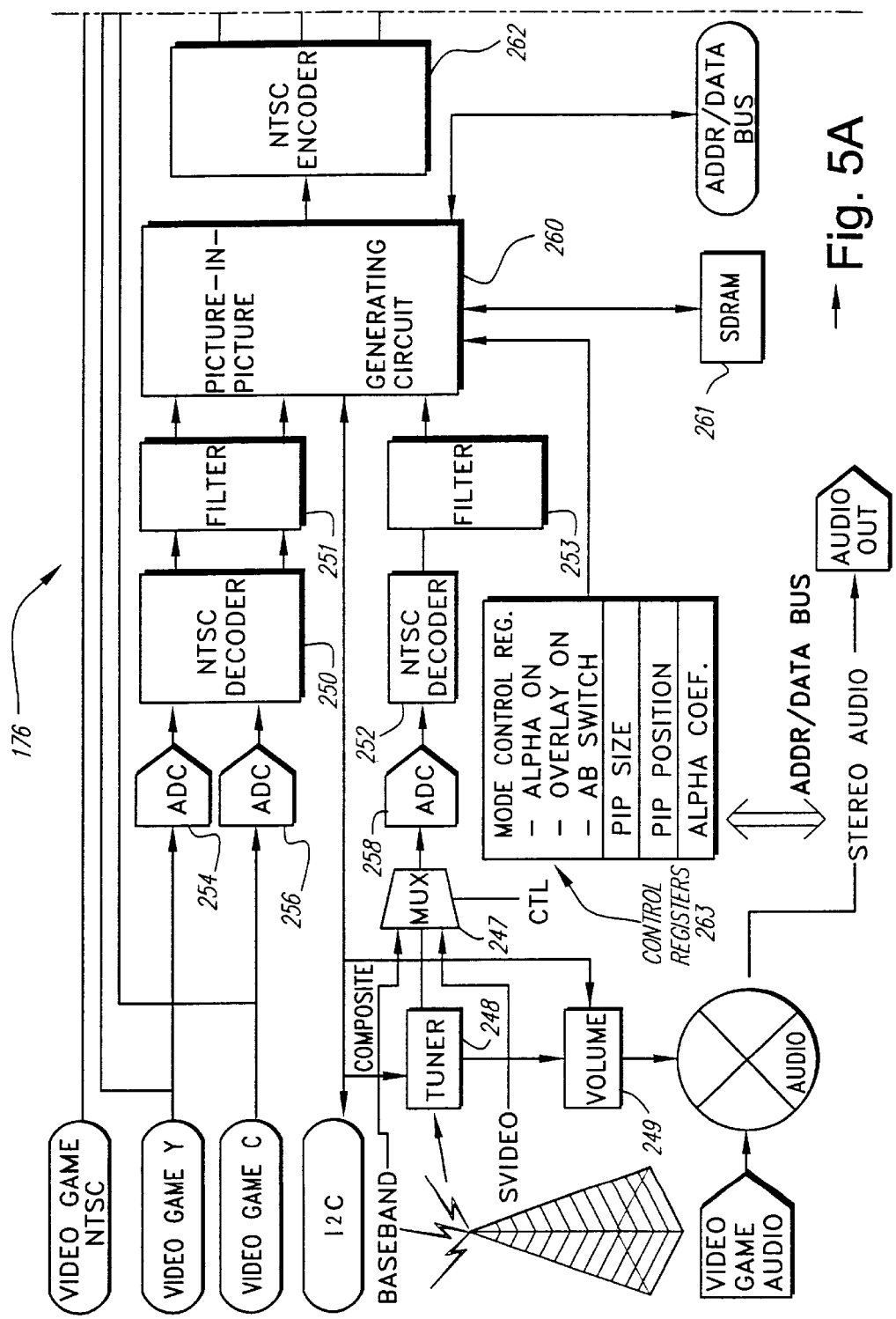
FIGS. 5A and 5B are a block diagram of the video circuit shown in FIGS. 3 and 4.
Figure 5B:
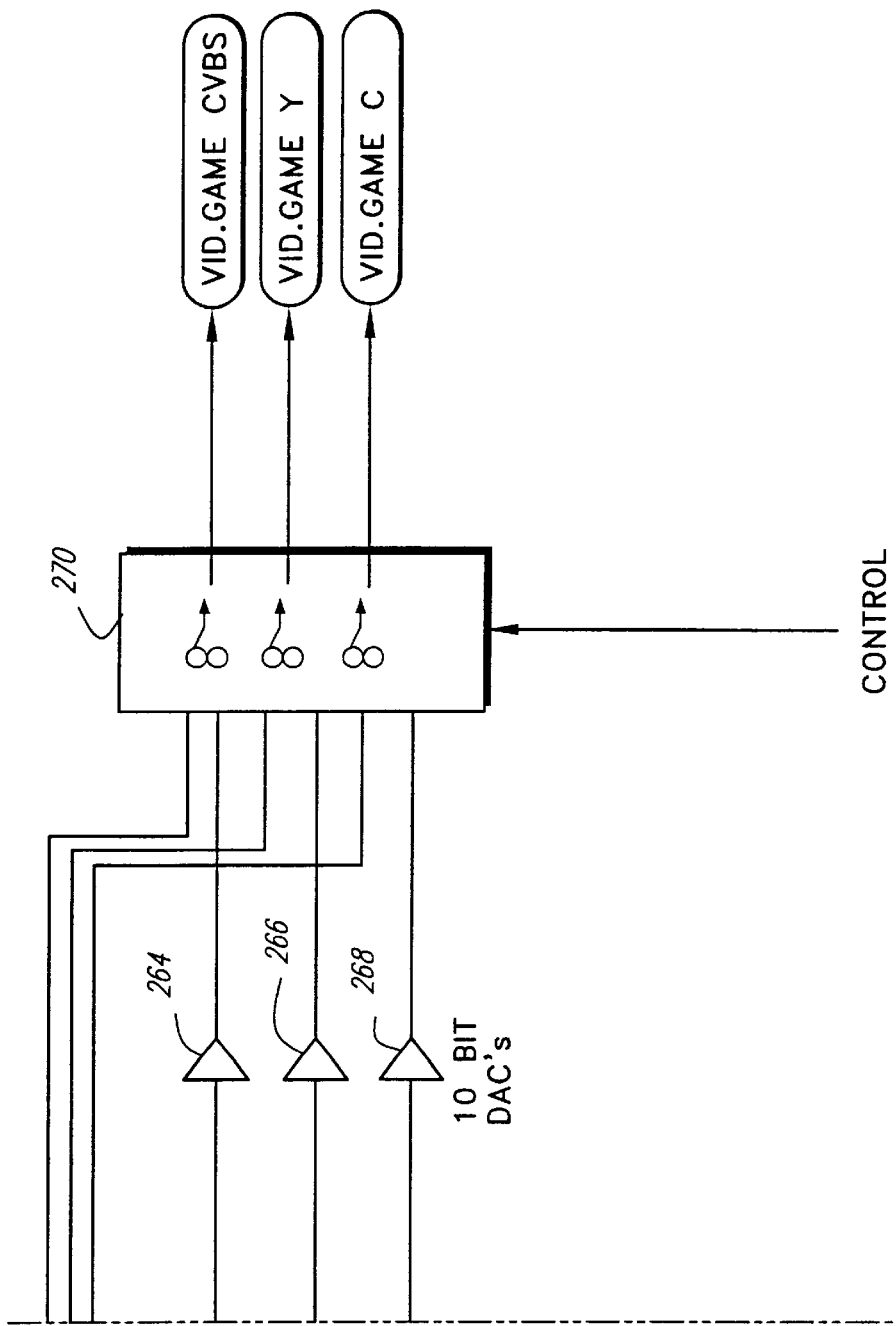

FIGS. 5A and 5B are a block diagram of video circuit 176 shown in FIGS. 3 and 4. Video module 176 includes control circuitry for generating a picture-in-picture display of the type commercially available in many high-end television sets. Additionally, video circuit 176 operates to generate overlays of one picture upon another, and alpha blending involving translucent overlays with the associated ability of scaling an image to a desired size. Video circuit 176 determines which image parts may be mixed and which are not to be mixed.

The video components are, for example, coupled via an $I^2C$ bus, which is a conventional serial bus designed for short distance communication. It provides a simple four wire, 400K bits per second interface for external expansion. The external expansion may be accomplished with an $I^2C$ port which may include printers, keyboards, mice, etc. and which may be used to control external video devices, such as tuners and picture-in-picture devices.

As shown in FIG. 5A, video circuitry 176 receives a complete NTSC signal and the SVIDEO signal output from video game system console 52 (FIG. 3). The SVIDEO signal is input via the Video Game Y and Video Game C inputs. Additionally, as shown in FIG. 5A, a broadcast TV signal is received and coupled to the video circuit's tuner 248, which outputs a baseband signal. Tuner 248 is preferably a 120 channel cable ready tuner having high signal quality. A baseband video signal also may be received by video circuit 176 and coupled to an input pin via the video game system 50 or, for example, from the output of a VCR (not shown), Direct Satellite box or a cable box. The baseband signal, an SVIDEO input signal and the output of tuner 248 are coupled to the inputs of multiplexer 247. Upon receipt of a control signal from, for example, control registers 263, one of these three multiplexer input signals is coupled to analog to digital converter 258, whose output is coupled to NTSC decoder 252.

As shown in FIG. 5A, the received signals are coupled to, for example, 8 bit analog to digital (ADC) converters 254, 256 and 258, whose outputs are in turn coupled to conventional NTSC decoders 250 and 252. The output of NTSC decoders 250 and 252 are coupled to noise processing filters 251 and 253, respectively. The output of filter 251, filter 253 and the signal received via input pin $I^2C$ are coupled to a picture-in-picture generating circuit 260 which is described further below in conjunction with FIGS. 6A and 6B.

In accordance with one exemplary embodiment of the present invention, control of the video circuitry 176 may be accomplished by control signals transmitted via the $I^2C$ input. For example, such control signals may be utilized under control of the video game console processor to set up the control registers 263, to obtain status information about the video circuitry 176, and to transfer frame buffer vertical blanking interval data to the video circuitry 176. Alternatively, such control functions may be controlled in response to signals transmitted over the video game system address/data bus. The I²C pin may be utilized to, for example, query tuner 248, to determine whether there is a signal on a particular channel that has been set (to indicate whether the desired channel has been locked on). The I²C input may be used to control tuner 248, volume control 249, and modulator 61 and bypass switch 63 shown in FIG. 1C.

Picture-in-picture generating circuit 260 may operate in various programmable modes. For example, it may capture an input picture image and store it in SDRAM 261. Alternatively, in accordance with an exemplary embodiment, picture-in-picture generating circuit may digitally "mix" two of its inputs together as instructed based upon the output of control registers 263. Picture-in-picture generating circuit preferably operates to perform picture composing operations to generate a composite picture by partially overwriting picture image data from one source with composite picture data from another source. Such image mixing typically utilizes SDRAM 261 in that a received signal is mixed with a previously received and stored signal resident in SDRAM 261 for time-base correction purposes.

In mixing operations where one image is overlayed on another, chroma key processing may be utilized. In chroma key image processing, an image is generated by, for example, the video game system 50 having a background of a predetermined key color. A second image is generated and the two are mixed together in an overlay display as is explained further in detail below.

Instead of an overlaying operation, an alpha blending operation may be controlled by setting a particular bit in the mode control register shown as one of the control registers 263. Such a blending operation may, for example, be used to generate a display where the channel number or information about a particular show is generated at the bottom portion of the television screen.

In picture-in-picture processing, an image is extracted from SD RAM 261. The display of the extracted image is preferably programmable as to its size and display position on the display screen. As indicated in FIG. 5A, the picture-in-picture generating circuit 260 is accessible via the video game system address/data bus (Addr/Data Bus) as are the control registers 263, wherein picture-in-picture size and origin location position data is stored.

An NTSC encoder 262 receives an image bit map from picture-in-picture generating circuit 260 and adds the appropriate horizontal and vertical synchronization signals required for television display. As shown in FIG. 5B, the output of NTSC encoder 262 is coupled to an analog video switch 270 via digital to analog converters 264, 266, and 268.

As shown in FIGS. 5A and 5B, additional video game inputs are directly coupled to analog video switch 270 to provide an optimal high quality path for video game play. By virtue of the separate paths shown in FIGS. 5A and 5B to the analog video switch, either the raw untouched video game system data is coupled to the user's TV or the appropriately mixed, processed data is coupled to the TV. Based upon the current processing mode as indicated by its control input, analog video switch 270 chooses between the raw video game data inputs or the processed video inputs to couple to the TV.

Video circuit 176 also includes control registers 263 including a mode control register having control bits, the state of which triggers the picture-in-picture generating circuit and the analog video switch to enter a selected mode. For example, one or more mode control bits (AB switch) controls the state of analog video switch 270. Further bits control whether the overlay, alpha blending, or picture-in-picture mode is on.

Another of control registers 263 stores an alpha coefficient for controlling, for example, the extent to which a video image comes from the video game system versus from a tuner source. One or more other of control registers 263 store picture-in-picture size and position information. As will be understood by those skilled in the art, still other control registers may be used to control any of a number of other conventional functions not described above. As shown in FIG. 5A, control registers 263 are accessible to the video game system via the video game system's address and data bus (Addr/Data Bus).

In accordance with an exemplary embodiment, the picture-within a picture generating circuit 260 determines which screens of either the video game, broadcast television, or video recorder are selected, and it determines the screen size and at what coordinate position the selected screens will be displayed based on control data from the CPU 100 which is temporarily stored in control registers 263. The picture-in-picture generating circuit 260 generates the picture image data so as to display the various screens indicated by the control data onto the designated coordinate position and having the designated size. Thus, the picture-in-picture generating circuit 260 selects, for example, any one or two or more of the signals from among the game signal from a video game, a broadcast television signal from an antenna (or, for example, from Direct Broadcast Satellite or cable), and the picture image signal from a video recorder. After making such selections, circuit 260 may, for example, write the picture image data to a partitioned storage area that corresponds to each signal type (e.g., game, TV, video-tape recorder, Internet, etc.) in SD-RAM 261; where the maximum size of picture image data (e.g., the background picture image being assigned the lowest order of priority) is written to one frame portion of the display memory based on size data and priority data, and where the picture image data of the picture image having a smaller size and being assigned a higher priority order is written (over written) to the display memory storage area of the position that corresponds to the coordinates where it should be displayed by appropriately compressing the picture image so that it becomes a picture image data of the desired size. Thus, information from two or more video game portions of SD-RAM memory 261, TV, portion of SD-RAM 261, and video tape recorder portion 261 are written to a frame buffer portion of SD-RAM 261. In such a manner, by reading the display data that is stored in the display memory area of the SDRAM 261, into the display line generator search of the television image receiver, the display of two or more screens of a picture-within a picture from among a game screen, a television screen, and a video screen may be realized. The software for controlling the picture-in-picture processing may be stored in, for example, boot ROM 182.

Figure 6A:
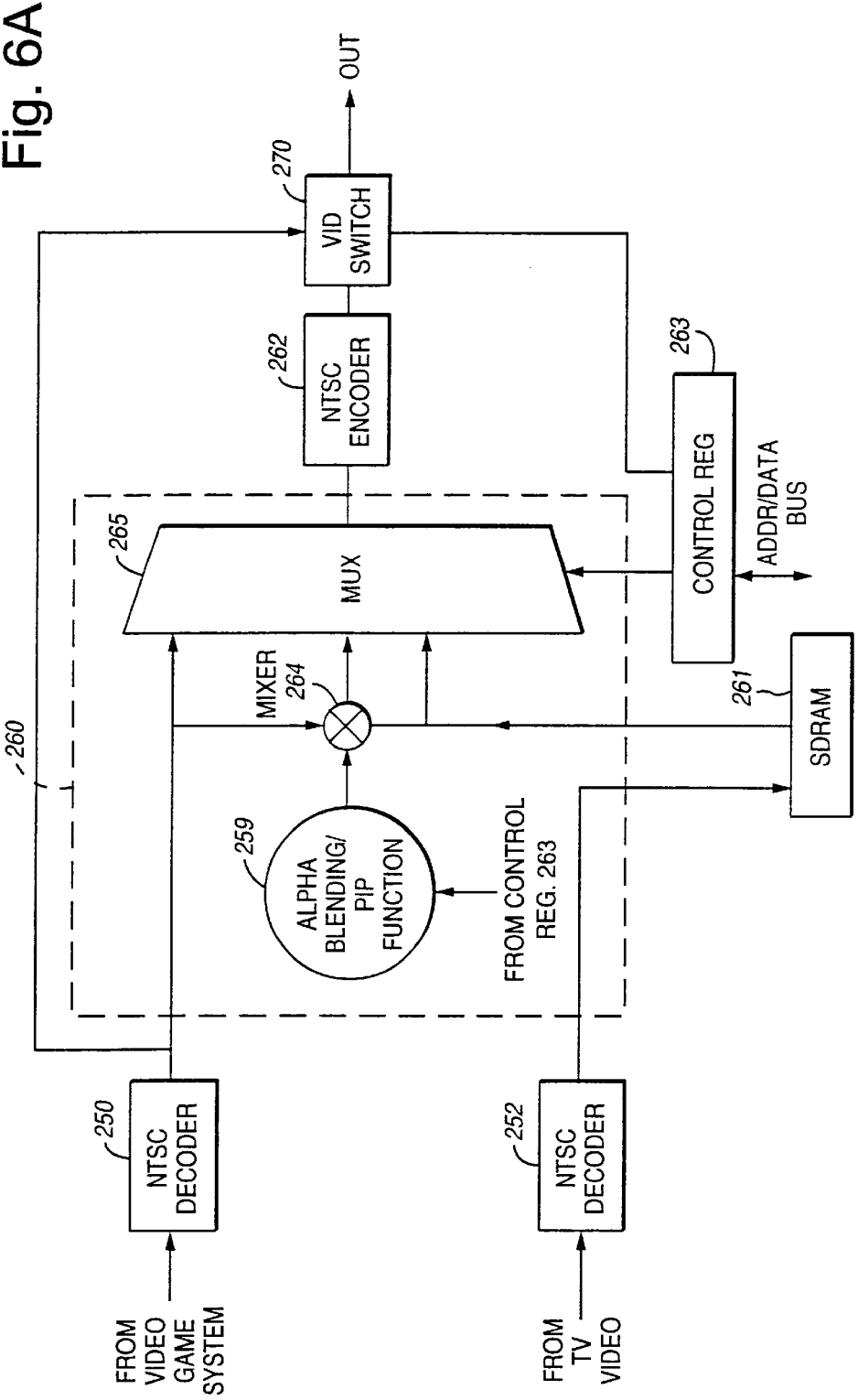
FIG. 6A is a block diagram depicting an exemplary picture-in-picture generating circuit in further detail in conjunction with other components shown in FIG. 5A and FIG. 5B.

FIG. 6A is a block diagram showing one exemplary embodiment of the picture-in-picture generating circuit 260 in further detail. As described in conjunction with FIG. 5A, signals from a TV video source are input to NTSC decoder 252 and then stored in SDRAM 261. The video game system video signal is coupled to NTSC decoder 250 and also directly coupled to video switch 270. Image data is then accessed from SDRAM 261 and either mixed via mixer 264 with other image data generated by alpha blending and picture-in-picture graphics generating circuitry 259 or is directly input to multiplexer 265. The alpha blending, picture-in-picture, and overlay generating circuitry 259, in accordance with one exemplary embodiment, may be of conventional design. The graphics circuitry 259 is responsive to the contents of the mode control register to determine whether, for example, an alpha blending operation is to be performed. If so, an alpha coefficient for controlling the extent to which a video image is to come from a particular source is provided from control registers 263. If operation is to take in a picture-in-picture processing mode, the graphics circuitry 259 will receive, for example, a control signal indicative of picture-in-picture mode and picture-in-picture size and position information. As shown in FIG. 5A, additional inputs may be coupled to multiplexer 265.

A selected one of the inputs to multiplexer 265 is coupled to the multiplexer output under the control of the contents of mode control register resident within registers 263, which as described above defines the desired mode of operation, i.e., alpha blending mode, overlay mode, picture-in-picture mode. Operation may also proceed in a chroma key mode. If operation is in chroma key mode, a key color will be searched for, and, if detected, a TV based image is, for example, selected for display. If the key color is not detected, a video game system image is selected. As previously explained, once the multiplexer input has been selected for output, it is then coupled to NTSC encoder 262 and then is output via video switch 270 whose switching state is controlled via the contents of mode control register 263.

Figure 6B:
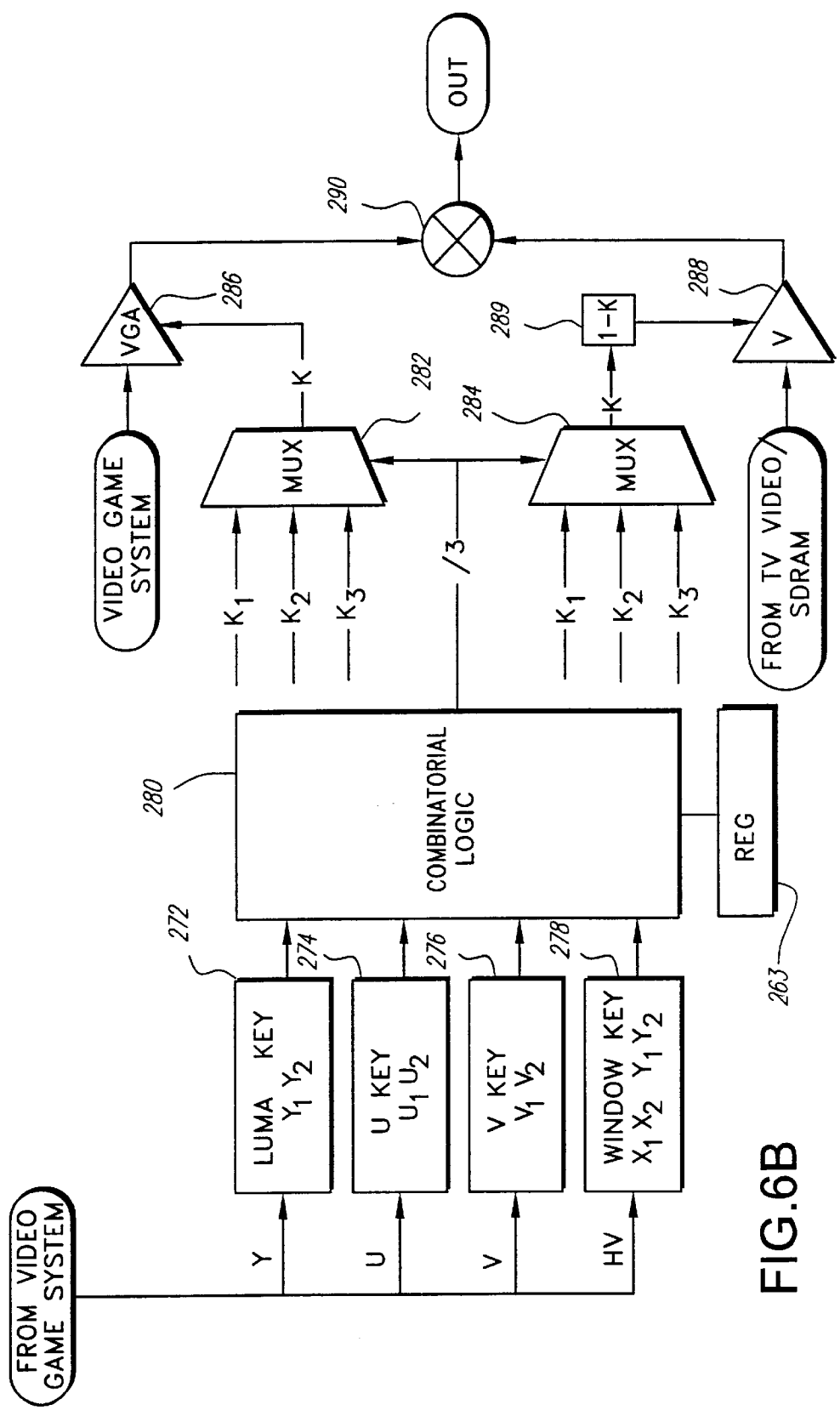
FIG. 6B shows an exemplary implementation of picture-in-picture generating circuit 260 shown in FIG. 6A.

FIG. 6B shows an exemplary embodiment of the picture-in-picture generating circuit and chroma key processing circuit 260 shown in FIG. 6A. The TV video signal output from NTSC decoder 252 which is input to SDRAM 261 as shown in FIG. 6A is represented in FIG. 6B as the image data which is input to FIG. 6B's variable gain amplifier VGA 288. The video game system output signal from NTSC decoder 250 shown in FIG. 6A is input at the "From Video Game System" input of FIG. 6B.

As represented in FIG. 6B, the digitized video game signal components are separated into luminance Y, chrominance U, saturation V, and horizontal and vertical pixel clock timing. These digitized signals are loaded into respective luminance, chrominance, saturation and horizontal and vertical pixel clock processing sections 272, 274, 276, and 278. Luma key section 272 includes two registers. storing two luminance values, $Y_1$ and $Y_2$. The $Y_1$ and $Y_2$ luminance values are loaded in accordance with the video game program and represent the minimum and maximum luminance values for the luminance key to fire. More specifically, if the real time luminance value for Y falls within the defined minimum and maximum luminance values, then the luma key is indicated as being logically positive. This condition indicates that the selected brightness or luminance coming out of the video game signal is intended to be chroma keyed with a different signal as explained above. In the same manner, the chrominance U key section 274 and the saturation V key section 276 are respectively loaded with values $U_1$, $U_2$, and $V_1$, $V_2$, representing the maximum and minimum values for chrominance and saturation with the same chroma keying effect as explained above with regard to luminance.

Window key section 278 includes registers storing horizontal pixel clock values $X_1$, $X_2$ and vertical pixel clock values Y1, Y2 representing a rectangular area defining the size and position of the picture-in-picture display. If the real time horizontal and vertical pixel clocks values fall within the rectangular region defined in the window key registers 278, then a positive condition is indicated for the window chroma key. Thus, four separate conditions are utilized in FIG. 6B which may create a positive value for chroma key operations.

Combinatorial logic 280 receives the outputs of registers 272, 274, 276 and 278. Combinatorial logic 280 defines programmable boolean conditions, which are set by, for example, registers 263 loaded from the video game console address/data bus to thereby select a blending value $K_1$, $K_2$ or $K_3$ which are programmable and may vary between 0 and 100%. For example, combinatorial logic 280 may be programmed such that, if the luma key 272 is a logical "I" and if the horizontal and vertical pixel clocks indicate that the image is within the defined window, as indicated by the window key, then a predetermined blending value key $K_1$ (or $K_2$ or $K_3$) is to be selected.

In accordance with one exemplary embodiment, chroma keys $K_1$, $K_2$, $K_3$ are shown as inputs to multiplexer 282. $K_1$ or $K_2$ or $K_3$ will be selected based upon the output of combinatorial logic 280, which is coupled to the control input of multiplex 282. Accordingly, combinatorial logic 280 evaluates the outputs of luminance key section 272, chrominance key section 274, saturation key section 276 and window key section 278 under the control of registers 263 to select a value $K_1$, $K_2$, or $K_3$. Multiplexer 284 includes inputs $K_1$, $K_2$, and $K_3$ which are the same $K_1$, $K_2$, and $K_3$ values input to multiplexer 282.

By way of example, presume that a blending value $K_2$ selected by multiplexer 282 represents 70% blending of the video game system data. The counterpart selection in multiplexer 284 is coupled to block 289 which generates a "$1-K_2$" or 100%–70% or 30% blending value. These respective signals are input to variable game amplifiers VGA 286 and 288 whose variable gains are controlled by the selected blending value. Thus, the blending operation would blend 70% of the video game system signal with 30% of the TV video signal from SDRAM 261.

Once outside the selected window, the combinatorial logic 280 selection may result in selecting a $K_1$ blending value rather than $K_2$. If, for example, the chrominance value input to U key 274 became positive at a different time than the luminance luma key 272 output, combinatorial logic 280 may select blending value $K_3$ which may result in a 100% selection of the video game system and no selection of the TV video signal. A wide range of overlay and blending operations beyond those described above will be apparent to those skilled in the art in light of the above description and are contemplated by the present invention.

The outputs of variable gain amplifiers 286 and 288 are mixed at mixer 286. The mixer 286 output is then coupled to NTSC encoder 262 shown in FIG. 6A.

Figure 6C:
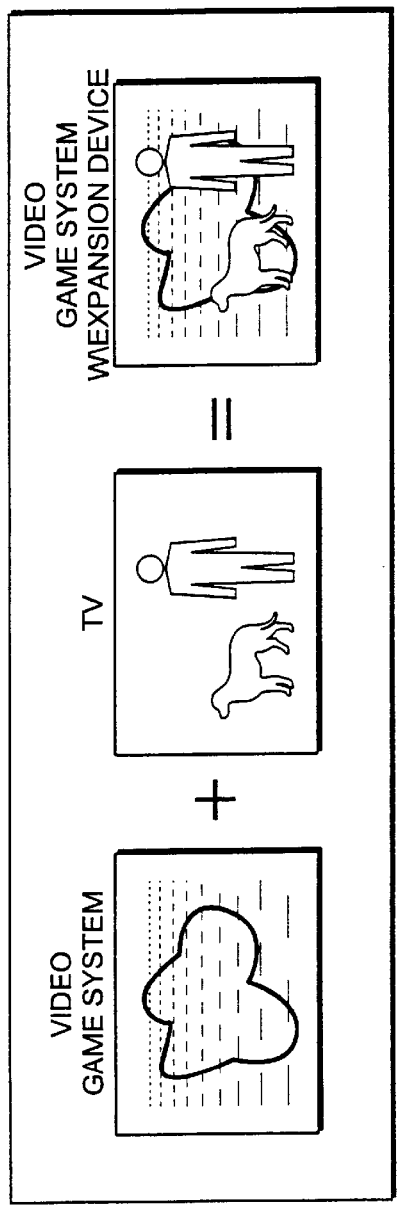
FIGS. 6C and 6D show exemplary overlay screen displays which may be generated in accordance with the present invention.
Figure 6D:
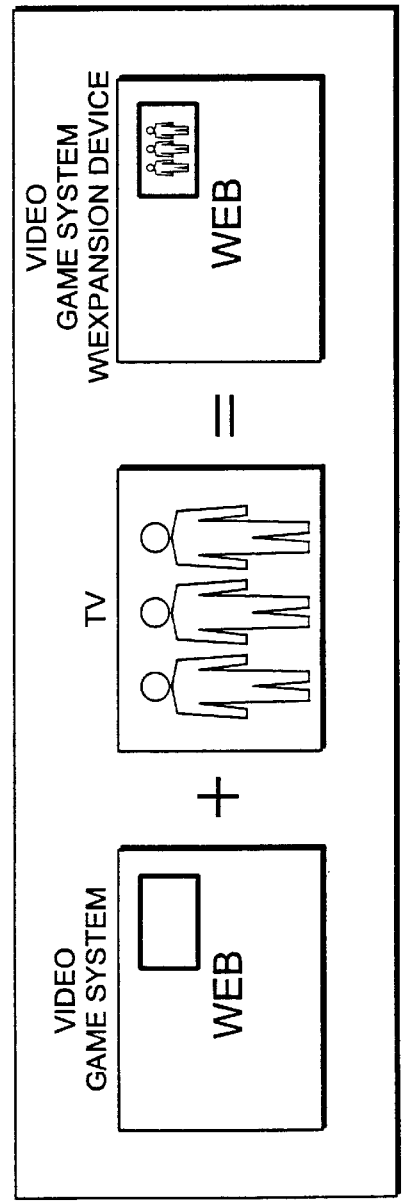

FIGS. 6C and 6D exemplify two of the many possible mixing and overlay screen display results achievable in accordance with the present invention. As shown in FIGS. 6C and 6D, the left most figure in FIGS. 6C and 6D represents the signal from the video game system console 52. The middle figure shows, for example, a broadcast TV display. The figures on the far right show exemplary combined outputs in accordance with the present invention. FIG. 6C shows a relatively simple combination of the video game system and TV picture outputs. In FIG. 6D, although "WEB" is shown on the video game system display screen, it should be understood that any textual message or image may be displayed. The box in the video game system display represents the keying color area. The combined screen in FIG. 6D shows the textual information, where the colored box is replaced with a scaled-down version of the three, people represented in the TV image. The K value in FIG. 6B may represent, in this case, 100% of the TV tuner signal. However, the tuner signal is scaled down to the picture-in-picture display size shown in FIG. 6D.

Figure 7:
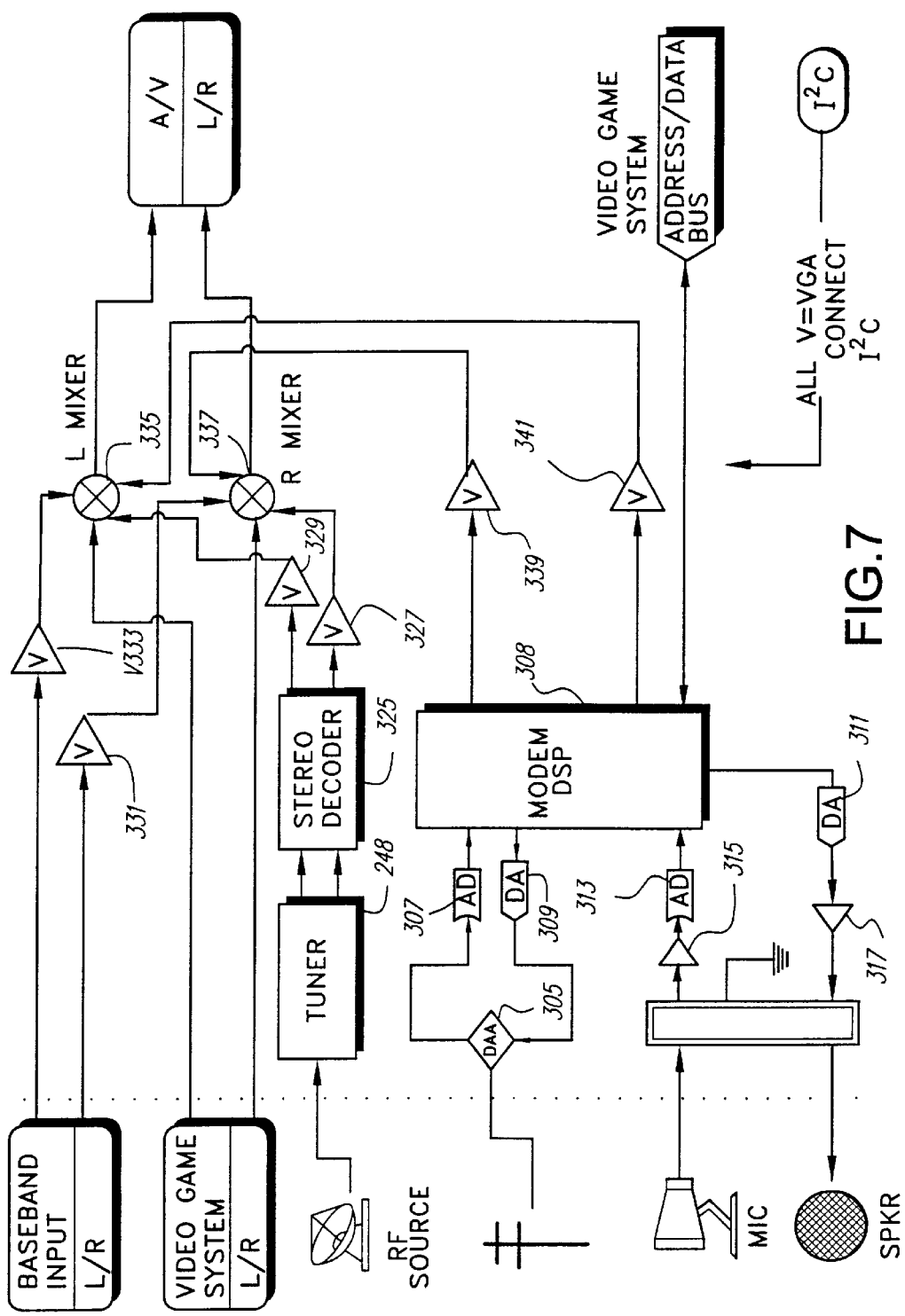
FIG. 7 depicts the audio/modem processing circuit in further detail.

FIG. 7 shows the audio and modem processing circuitry of FIG. 3's block 188. Audio circuit 188 includes a baseband audio/video input for the left and right channels. The baseband input may be an audio signal from a VCR or a cablebox baseband output or Direct Broadcast Satellite or camcorder or other audio source. As shown in FIG. 7, video game system audio/video signals for the left and right channels are also input to audio circuit 188. Additionally, as shown in FIG. 7 an audio signal received from a RF source such as TV, cable or Direct Broadcast Satellite, is input to tuner 248.

The tuner 248 demodulates the signal into an intermediate frequency and inputs the intermediate frequency and a mixing frequency into a stereo decoder 325 that completes the demodulation process and outputs left and right stereo channel signals. The stereo decoder 325 mixes the signals down to provide a baseband signal and separates out the left and right channels which are respectively input to variable gain amplifiers (V) 329 and 327.

Focusing next on the modem related structure, the telephone line is coupled to data access arrangement DAA 305, which includes analog front-end modem circuitry, such as the transformer which couples the signal received over the telephone line to conventional modem processing circuitry. The signal from the telephone line is then coupled to analog-to-digital converter 307 which is in turned coupled to a digital signal processor 308. Digital signal processor 308 executes a modem program which decrypts the data from analog-to-digital converter 307 and couples it to the video game system address/data bus. Data likewise flows in the opposite direction from video game system 50 via the address/data bus to the digital signal processor 308. The received data is processed by DSP 308 to, for example, the appropriate modem V.34 or V.90 format. The data is then converted back to an analog via digital-to-analog converter 309 and coupled to the telephone link via DAA 305.

A microphone input is included whose output is coupled to analog-to-digital converter 313, after being amplified by amplifier 315. DSP 308 processes the digitized microphone data which is then converted to analog data in digital-to-analog converter 311. This microphone data may then be fed back to the FIG. 7 speaker through amplifier 317.

Alternatively, the digitized microphone data from converter 313 may be coupled to video game system 50 via the DSP 308 and the Address/Data bus. In this fashion, the user may record voice data and store it on hard drive 206 and use such data if desired in conjunction with conventional speech processing software.

Audio information may be fed to the speaker through amplifier 317 either from video game system 50 or alternatively from within the expansion device itself. Mixing may occur in either of the video game 50 or the expansion device 95.

Audio circuit 188 also includes left and right channel mixers 335, 337 which mix the following input signals. Modem DSP 308 has left and right channel outputs which are respectively coupled to left channel mixer 335, and right channel mixer 337 through variable gain amplifiers 341 and 339. The above-described baseband left and right channel inputs are respectively coupled via variable gain amplifiers 333 and 331 to left channel mixer 335 and right channel mixer 337. The baseband tuner 248 input is coupled to the mixers 335 and 337 via variable gain amplifiers 329 and 327. The video game system left and right channel inputs are coupled to left and right channel mixers 335 and 337 without being amplified. All other components are coupled to the mixers through variable gain amplifiers so that the signals are controllably amplified relative to the video game system signals.

Left channel mixer 335 and right channel mixer 337 serve as summing junctions to combine the respective input signals. The gain of all the variable gain amplifiers shown in FIG. 7 are controlled via signals received via the I$^2$C bus control input.

The outputs from left channel mixer 335 and right channel mixer 337 are coupled to the audio/video output of a home TV or alternatively, as shown in FIG. 1C to a VCR and then to a TV. The left and right channel outputs are coupled to the modulator 61 shown in FIG. 1C through the A/V output shown in FIG. 7.

As shown in FIG. 7, the baseband, video game system and tuner inputs are mixed by mixers 335 and 337 and coupled to the audio/video output connector. The modem DSP 308 can receive audio signals received through the phone line via DAA 305 or alternatively, voice signals may be input through the microphone input. The voice signal may be mixed with other received signals or may be routed through the speaker to thereby enable the system to act, for example, as a speaker phone. Additionally, as shown in FIG. 7, the modem DSP has a digital connection to the video game system through the address/data bus. This allows audio information to be digitized and passed to the video game system. Audio information may also coupled to the modem DSP from the video game system address/data bus.

Using the system shown in FIG. 7, either analog or digital data may be coupled to the telephone lines. Analog data may also be coupled locally to the associated speaker which may be a speaker phone or phoneset. Analog data may be received via the microphone and coupled to the video game system 50 or alternatively out to the modem (shown in FIG. 7 as DAA 305 AD 307, DA 309, DSP 308). In addition to the audio output from the video game system 50, the audio output component from a TV source may be coupled to the audio processing system via the tuner 248 path shown in FIG. 7. With the audio processing circuitry shown in FIG. 7, in accordance with a further embodiment of the present invention, it is contemplated that the system may function as a telephone answering device and/or include features such as caller ID, DSVD, Radish VoiceView, and support speaker phone operation.

FIG. 8 is an exemplary video game system 50 memory map, which shows an exemplary set of memory locations which are available for the expansion device described herein. The video game system 50 is an I/O memory mapped system. The memory map identifies the name of the register associated with a location or a set of locations assigned to particular addresses (not shown). The read/write status of the locations and a description of the information stored at the location are shown in FIG. 8.

As shown in the FIG. 8 memory map, a location is reserved for storing the Disk Status so that it can be determined if the disk is available to be read. The memory map also provides for a logical block address LBA for reading or writing. Writing to the LBA Write Address location causes the contents of the sector buffer to be written to the logical block address pointed to by the LBA write address. Similarly, writing to the LBA Read Address causes the contents of the logical block address pointed to by the LBA read address to be read into the sector buffer. With respect to each of the LBA read and write address operations, the sector buffer counter is reset.

The Interrupt Status Register identifies, for example, which peripheral devices need service in response to a generated interrupt signal. The exemplary contents of an Interrupt Status Register is shown in FIG. 9.

As shown in FIG. 9, a bit in the Interrupt Status Register indicates when modem data is ready to be read and a further bit indicates when there is modem data ready to send. Additional modem related bits may be included as will be appreciated by those skilled in the art, to provide, for example, a carrier detect bit or a data overrun bit. The RTC Alarm bit is an alarm bit which is set from the real time clock. The video circuit 176 which utilizes the $I^2C$ bus described above may generate interrupts and a bit indicative of such an interrupt is shown in FIG. 9. An interrupt also may be generated when Intercast data must be read from the vertical blanking interval and an intercast interrupt bit is shown in FIG. 9.

The Interrupt Status Register also includes various disk-related status indicators. The Disk Read Data Ready bit indicates that there is data in the disk buffer to be read. A Disk Write Completed bit indicates that the disk buffer is presently clear for writing. The Counter At Zero bit indicates whether the buffer counter is at zero. The buffer counter is utilized, for example, in controlling DMA data transfers.

Turning back to the FIG. 8 memory map, the Modem In and Modem Out locations indicate whether modem data is to be read or written and the associated modem status. Modem In relates to data coming into the video game system from the modem and Modem Out relates to data which is sent out by the video game system to the modem. The Modem Out Control location provides for modem control bits for controlling modem operations.

Also shown in FIG. 8 are various $I^2C$ bus related address, data and control registers, which are utilized to implement the communication between components connected via $I^2C$ bus.

Additionally, shown in FIG. 8 is the, for example, 512 byte register referred to as the sector buffer, which is read and written in order to send data back and forth to and from the hard drive 206. Once 512 bytes are written to the sector buffer, the data is, for example, forwarded to the hard drive DSP controller 194 and then coupled to the hard drive. When an LBA read operation is performed, the LBA read address is set which informs the hard drive to be ready for data and which triggers an interrupt. As indicated in FIG. 9, this interrupt indicates that data is ready to be read.

Address space is additionally allocated to the Video/Intercast space. In this memory space, the video data or intercast data, which is, for example, stored in SDRAM 261 of FIG. 5A may be accessed.

Merely because a component has not been described above in conjunction with the memory maps of FIGS. 9 and 10 should not be interpreted as an indication that the component is not directly addressable. For example, the video game system 50 also includes in its address space, memory locations reserved for game cartridge ROMs, various system resources, the video game system coprocessor and other system components.

Figure 10:
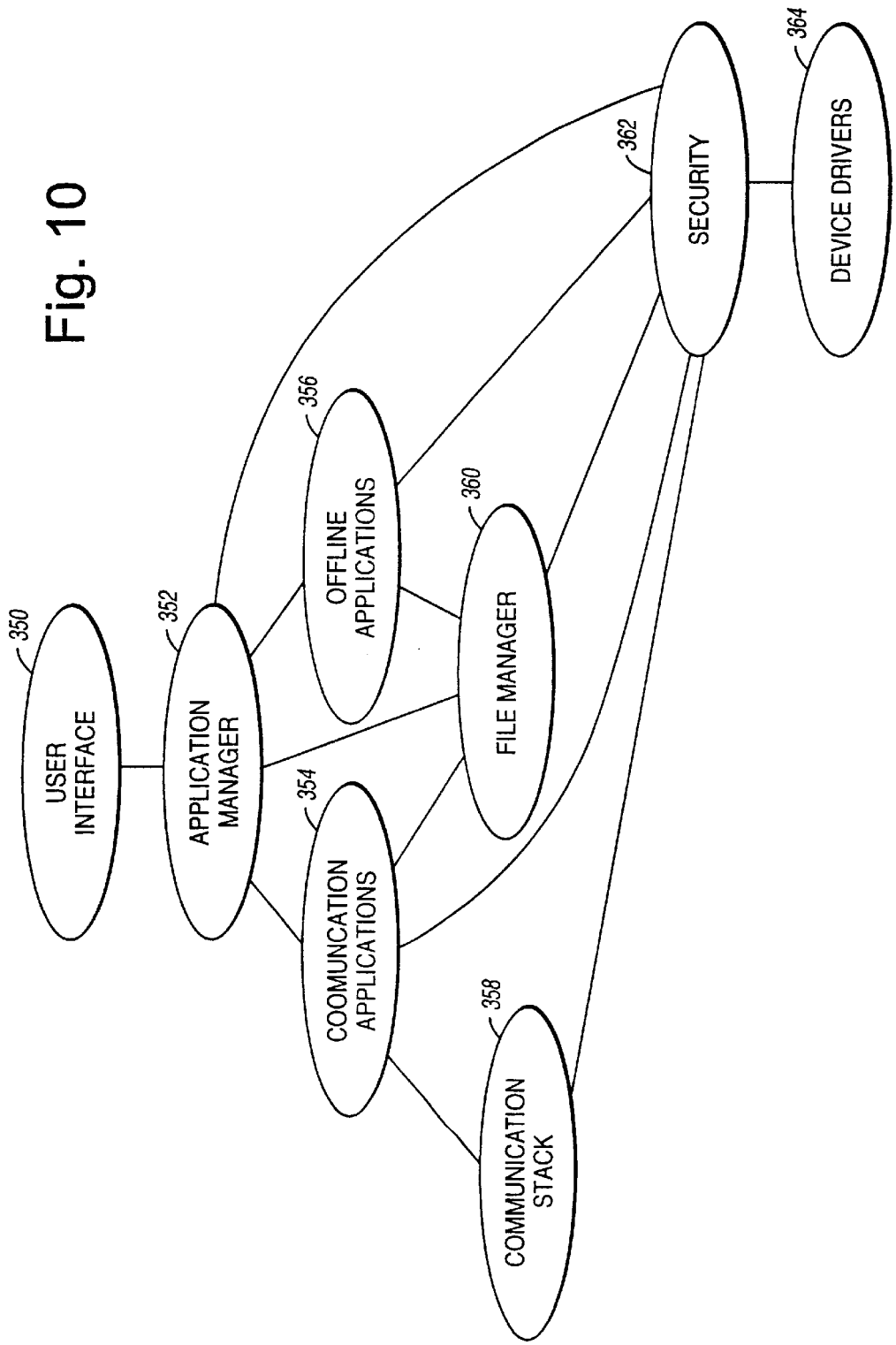
FIG. 10 is a block diagram of system software modules in accordance with the present exemplary embodiment.

FIG. 10 is a block diagram of exemplary system software modules which may be utilized in conjunction with the present exemplary embodiment. The user interface 350 is the user interface which permits a user to select features provided by the application manager 352. The user interface therefore presents to the user a set of selectable operations.

The application manager 352 is the module which controls which applications are executed and which are not. Additionally, it exercises control over the file management system 360.

As described above, some of the applications that may be run in the video game system 50 as expanded by expansion device 95 are communications applications, which are controlled by a communications applications module 354. Such applications include an Internet browser, which may, for example, be a conventional browser providing e-mail and other capabilities appreciated by those skilled in the art.

The system also provides for off-line applications controlled by an Off-line Applications module 356. Module 356 provides calculator, word processor, TV guide and other applications. With respect to the TV guide off-line application, the TV guide may, for example, be accessed via the Internet. Once the TV guide is resident in hard drive 206, the Off-line Applications module 356 manages the various operations performed with respect to the TV guide data.

As shown in FIG. 10, all applications have access to File Manager module 360. File Manager 360 controls the files which are stored on hard drive 206 or other mass memory module utilized in the system. The File Manager 360 must in turn pass through the security layer controlled by the Security module 362 before decryption of data stored in the disk is possible.

Additionally, as shown in FIG. 10, a communications stack module 358 is included, which includes the standard PPP, TCIP and the secure sockets layer (SSL), which are standards necessary for communicating securely over the Internet.

The Security module 362 has access to the various drivers which communicate with the disk drive and the modem. Device drivers 364 include low level device controlling software, which controls, for example, how modem buffers are filled, which sectors are written to on the disk.

Figure 11:
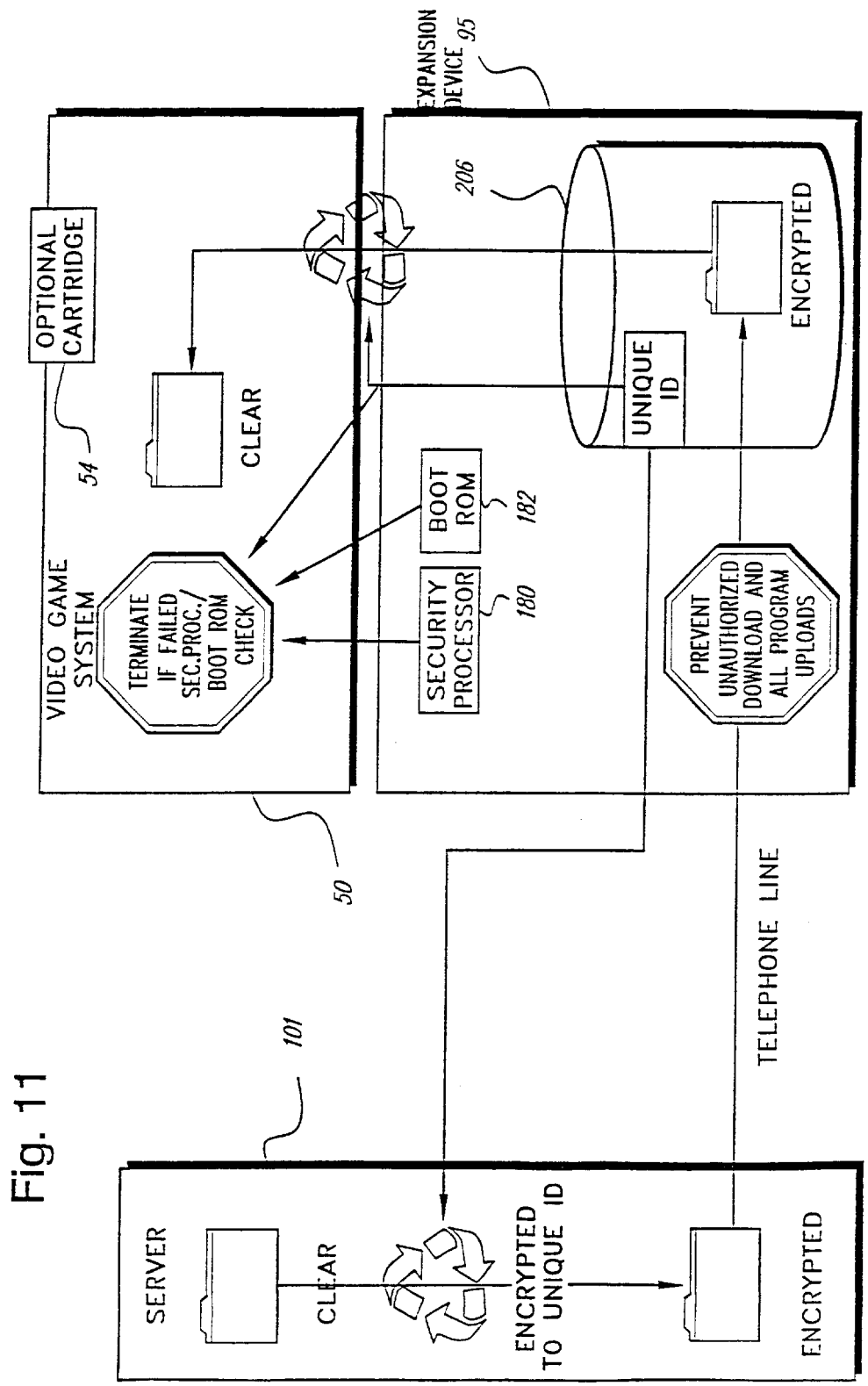
FIG. 11 is an exemplary block/flow diagram of security features which may be utilized in the illustrative embodiments.

FIG. 11 is a block/flow diagram of an exemplary representation of security features which may be utilized in conjunction with the present illustrative embodiments. As will be appreciated by those skilled in the art, a wide variety of alternative variations of the security measures described below also may be advantageously utilized. As shown in FIG. 11, video game system 50 enhanced by expansion device 95 is coupled to a server 101 via a telephone line link. Video game system 50 preferably is a home video game system but alternatively may be a personal computer or the like. Expansion device 95, in accordance with one embodiment of the present invention, radically expands the capabilities of video game system 50 to include Internet access and other enhanced capabilities. Although server 101, in accordance with a preferred embodiment of the present invention, provides Internet access capabilities, communication over other communication networks is also contemplated by the present invention.

System security in accordance with the exemplary embodiments relies upon multiple independent levels of security. The security features described below are preferably utilized in conjunction with strong encryption methodologies available via the Internet, such as RSA's secure socket layer (SSL) and the password login security check associated with establishing an Internet connection.

Strong security protection features are particularly desirable for Internet access related modes of operation. In accordance with one possible mode of operation, a user may wish to purchase and download a new software package from a vendor's web site. During such a transaction, a screen may, for example, be displayed for the user, giving the user an option to purchase particular game software.

In accordance with the presently preferred embodiment, the security features of the present invention are implemented in conjunction with the expansion device 95 and its unique disk drive. controller and little or no trust is placed in video game system 50 for security purposes.

Prior to explaining in detail, the presently preferred implementation, an alternative embodiment is first generally described, wherein video game system 50 is more actively involved in security operations than in the description of the preferred embodiment which follows. In accordance with this other possible exemplary embodiment, a set of public keys are exchanged between the hard drive DSP controller 194 (FIG. 4) and server 101 (FIG. 11) under the control of the video game system processor system. To download a game, video game system 50 sends a request to the hard drive controller 194 for a set of keys with which to encrypt. A private encryption key is then transmitted to server 101 in encrypted form. The server 101 encrypts the game software with the encryption key and transmits the game software for storage in hard drive 206 after processing by the video game system 50.

In order to play the game, a unique session key is transmitted to video game system 50 after being appropriately encrypted by, for example, the hard drive DSP controller 194. The video game system 50 decrypts the session key for the particular session.

Security processor 180 and boot ROM 182 provide additional security layers particularly during power-up authentication, the operation of which varies depending upon the startup operating mode. For example, video game system 50, as enhanced by expansion device 95, may execute the program resident in a video game cartridge 54, which has not been programmed to take advantage of expansion device 95 functionality. If so, DSP controller 194 recognizes that a cartridge 54 is attached, and disables expansion device 95 for security reasons to prevent the designer of a malevolent cartridge from infecting expansion device 95. In this mode of operation, the required security authentication involving security processor, 180 will not be successfully completable due, for example, to the failure to appropriately communicate with security processor 180.

In the mode of operation where video game system 50 and expansion device 95 are utilized without a game cartridge 54, in accordance with an exemplary embodiment of the present invention, the following security processing steps may take place. Initially, a check is made as to whether communication is established between a security processor 180 and a game cartridge security processor 152 (FIG. 2). In this operational mode, no such communication will be established, and an attempt is made to communicate between security processor 180 and a security processor associated with hard drive 206. If the security check between security processor 180 and the security processor associated with the hard drive 206 is successful, then boot ROM 182 is accessed.

Initialization code in the boot ROM is executed to, for example, perform further security check and self test functions. In one embodiment of the present invention, the contents of boot ROM 182 are encrypted. If the boot ROM security check is successful, the boot ROM information is decrypted, authentication information is then exchanged between the expansion device 95 boot ROM and the video game system console in, for example, the form of authentication certificates containing information necessary for authentication to take place. In an exemplary embodiment, the certificates are stored in DSP controller 194, which preferably is operable to generate and authenticate certificates.

Resident in boot ROM 182 is a set of instructions which permit the remainder of the expansion device operating system to be accessed. After authentication has occurred, the operating system stored in hard drive 206 is accessed. The operating system of the video game system 50 is likewise authenticated so that the presence of authentic code in both the video game system and expansion device is verified.

In an exemplary embodiment of the present invention, video games resident on hard drive 206 are encrypted. Any of various available encryption algorithms may be utilized in order to obtain the desired degree of security.

DSP controller 194 accesses encrypted information stored on hard drive 206 and transmits such encrypted information to video game system 50 such that multibyte sectors are received by video game system 50. In this embodiment, the information is decrypted by video game system 50.

Each manufactured hard drive 206 has a unique ID associated therewith which can't be read by a user. When a game is downloaded to the hard drive 206, the encrypted unique ID is coupled to DSP controller 194 and in turn passed to the server via video game system 50. The server uses the unique ID as a key to encrypt the game in accordance with an encryption algorithm. In accordance with one embodiment of the present invention, each purchased game may be uniquely encrypted. A downloaded game is received by video game system 50 where the game is decrypted and executed and stored in encrypted form on hard drive 206.

After such initial security checks are made, a display is generated showing various user options. By way of example only, the user has the option of choosing an Internet browser, any games that have been loaded on the hard drive 206, and a range of selectable application programs (which may be as comprehensive as desired and may, for example, include a calculator, a word processor, etc.). From the options screen, a user may initiate any of the selections by, for example, using a game controller or keyboard (if any is attached).

If the user selects an Internet browser, the application manager program loads the browser from hard drive 206 to the video game system console 52. The user is then prompted for password entry. After password entry processing, the video game processor instructs modem 186 to dial the Internet service provider's designated number and attempt to make the connection and execute the required code to establish communication.

After initial connection is established, the user name and password is transmitted and authentication takes place by the server to confirm communication with a registered user. Internet communication is established in a conventional manner as will be understood by those skilled in the art. Session information is exchanged and software is executed to appropriately update the browser, after which the user may utilize the Internet as desired.

In accordance with an alternative and presently preferred embodiment (which is described in detail in conjunction with FIGS. 12 through 18), the security features of the present invention are primarily incorporated into expansion device 95, such that the security system does not rely on the relatively insecure video game system 50. In accordance with this alternative embodiment, the video game system 50 is a game playing tool that is utilized to facilitate communications rather than to provide fundamental security features. Because signals are coupled between expansion device 95 and video game system 50 via a communication bus that is accessible, video game system 50 is inherently an insecure device.

The present exemplary embodiment focuses security control in a mass media (e.g., disk drive) controlling engine described below which is physically disposed within expansion device 95 housing (as close as possible to hard disk drive 206 and the downloaded video games and other data it is designed to protect). The illustrative embodiment incorporates security features into a disk drive controlling processing engine to provide security features which extend far beyond simplistic password systems which have heretofore been utilized in conjunction with disk drive controllers.

In the alternative preferred embodiment, security also is in part controlled by server 101, which downloads control information to the, for example, digital signal processor associated with hard drive 206. The disk drive controller (sometimes referred to herein as a "media engine") utilizes this control information to securely control disk partitions that are created, and to control which applications have access to respective partitions. As a security measure, the insecure video game system 50 has no control over which partitions are accessible. The disk controller's media engine responds to commands from server 101 to set up the disk partitioning. Thus, in accordance with one embodiment of the present invention, a direct security link exists between server 101 and a disk drive controller resident within the expansion device 95. Server 101 preferably utilizes the highest degree of available Internet security features such as, for example, RSA's secure socket layer (SSL), firewalls, etc.

With respect to server 101, in accordance with one exemplary embodiment, multiple Internet servers are used as the Internet service provider to support video game system 50 and expansion device 95. In a preferred embodiment of the present invention, a master security server controls e-commerce. A further server may be provided to supply game data and/or executable code to the server controlling e-commerce. In this fashion, an e-commerce server provides a request to the game system's server, which encrypts game data and provides all the necessary information to the e-commerce server of the Internet service provider. The e-commerce server then downloads user purchased games.

In accordance with an exemplary embodiment of the present invention, each expansion device 95 has a unique ID associated with mass media device 206. Unique encryption keys and the unique ID for each expansion device 95 are advantageously utilized to ensure secure communications between the expansion device 95 and server 101. When a request is made through expansion device 95 for downloading, for example, a purchased video game, server 101 is able to rely on the request as coming from a specific authorized expansion device 95 and not another device mimicking the expansion device 95. Accordingly, the link between server 101 and expansion device 95 may be trusted. As will be evident below, the "CPU" 50 is not required to be trusted.

The server 101 keeps track of which games have been downloaded. Thus, because all transactions are tracked, various downloading policy decisions may be readily enforced as to allowable transactions to prevent any undesirable transactions such as, for example, multiple downloading of the same game.

In accordance with an exemplary embodiment of the present invention, the disk controller incorporates an encrypting engine which encrypts in accordance with the readily available and highly secure "Two-Fish" encrypting algorithm. Although symmetric private keys are utilized by expansion device 95 and server 101, the disclosed encryption algorithm and use of symmetric private keys are illustrative and should in no way be regarded as limiting the scope of the present invention.

The preferred alternative security system (as shown in FIG. 11) also utilizes communication between security processor 180 and a security processor resident in video game system 50 as is further disclosed in U.S. patent application Ser. No. 08/850,676, entitled "SYSTEMS AND METHODS FOR PROVIDING SECURITY IN A VIDEO GAME SYSTEM", which is herein incorporated by reference. As described in detail in the copending application, when a player wants to a play a particular video game and is using an external storage containing the desired video game, a security microprocessor embodied within the external storage is coupled to the video game system 50. Upon power up, the security microprocessor within the external storage, e.g., game cartridge, sends an authentication key and an authentication code to a security processor resident within the peripheral interface 138 shown herein in FIG. 2. The peripheral interface 138 sends the authentication key to the video game main processor. The peripheral interface 138 retains the authentication code and does not reveal it to the video game system 50 main processor. The peripheral interface 138 of the main game unit has a copy of the same computation program used at the manufacturing facility.

The peripheral interface 138 includes a boot ROM that stores this computation program. The computation program is executed in the video game system 50 in a security processor resident within the external game cartridge. Assuming the external cartridge is authentic the main processor of the video game system 50 and the processor in the game cartridge, generate the same computation result, or one that bears a predetermined relationship with the result obtained by the counterpart processor. If the results are different, the game processor will not be permitted to execute the video game programs in the cartridge. A similar methodology is utilized in accordance with one embodiment of the present invention using the security processor 180 and boot ROM 182 of expansion device 95. Other security features described in the assignee's copending application Ser. No. 850,676, are preferably utilized in conjunction with security processor 180.

Boot ROM 182 ensures that expansion device 95 boots from known boot program code. Boot ROM 182 operates to boot the browser resident on disk 206. The browser may, if desired, be protected by the security measures described below with respect to other application programs.

A further level of security is provided by partitioning the hard drive 206 into various partitions whose security/accessibility is tightly controlled. One of the partitions resident on disk drive 206 is a scratch pad, read/write partition which is utilized, for example, for inter-processor communications. A read-only partition is also provided for storing commonly used files, such as font files, or sound files or the like.

In the illustrative embodiment, each application program, e.g., the browser or a game program, has three private partitions: 1) a read only encrypted partition where executable code resides, 2) a read-only data partition for holding less secure data and which is not encrypted to permit faster execution (since no decryption step is required), and 3) a partition for storing a wide range of game related data, such as a player's high score, the current location in a game, etc.

The game downloading procedure is controlled at server 101 so that only authorized games are permitted to be downloaded. Each game is encrypted with an encryption key unique to each individual hard drive 206. The server 101 utilizes the unique ID and encryption keys for each expansion device 95 to encrypt downloaded game software. In downloading operations, the server 101 uses a list of items for each game, including unique expansion device ID, e.g., a serial number, an expansion device 95 box encryption key and a game encryption key. In playing a game, the server 101 identifies the partitions which a particular game may access to the expansion device's disk controller.

Figure 12:
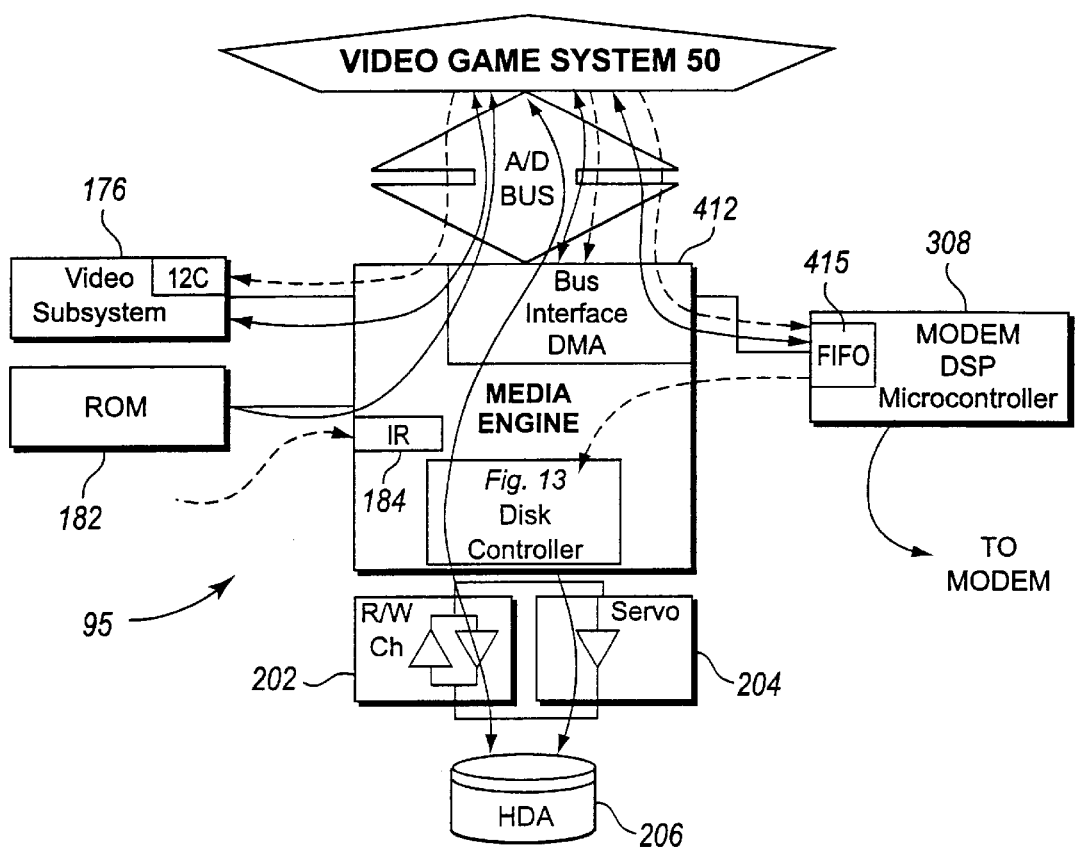
FIG. 12 is an illustrative block diagram showing the data and control signal flow between the video game system and the media engine.

FIG. 12 is a further block diagram of an exemplary expansion device 95 embodiment depicting the data flow (solid lines) and control signal flow (dashed lines) through the media engine with its security hardware and software enhanced disk controller which is described in further detail in FIG. 13 below. The components shown in FIG. 12 have been described in detail above and the system operation description which follows focuses on security related processing operations.

The disk controller provides integrated control for the mass storage device and many of the unique security features described herein. The disk controller includes a digital processor, random access memory, read-only memory, an encryption processing engine and a dynamic RAM memory as is described below in conjunction with FIG. 13.

Figure 13:
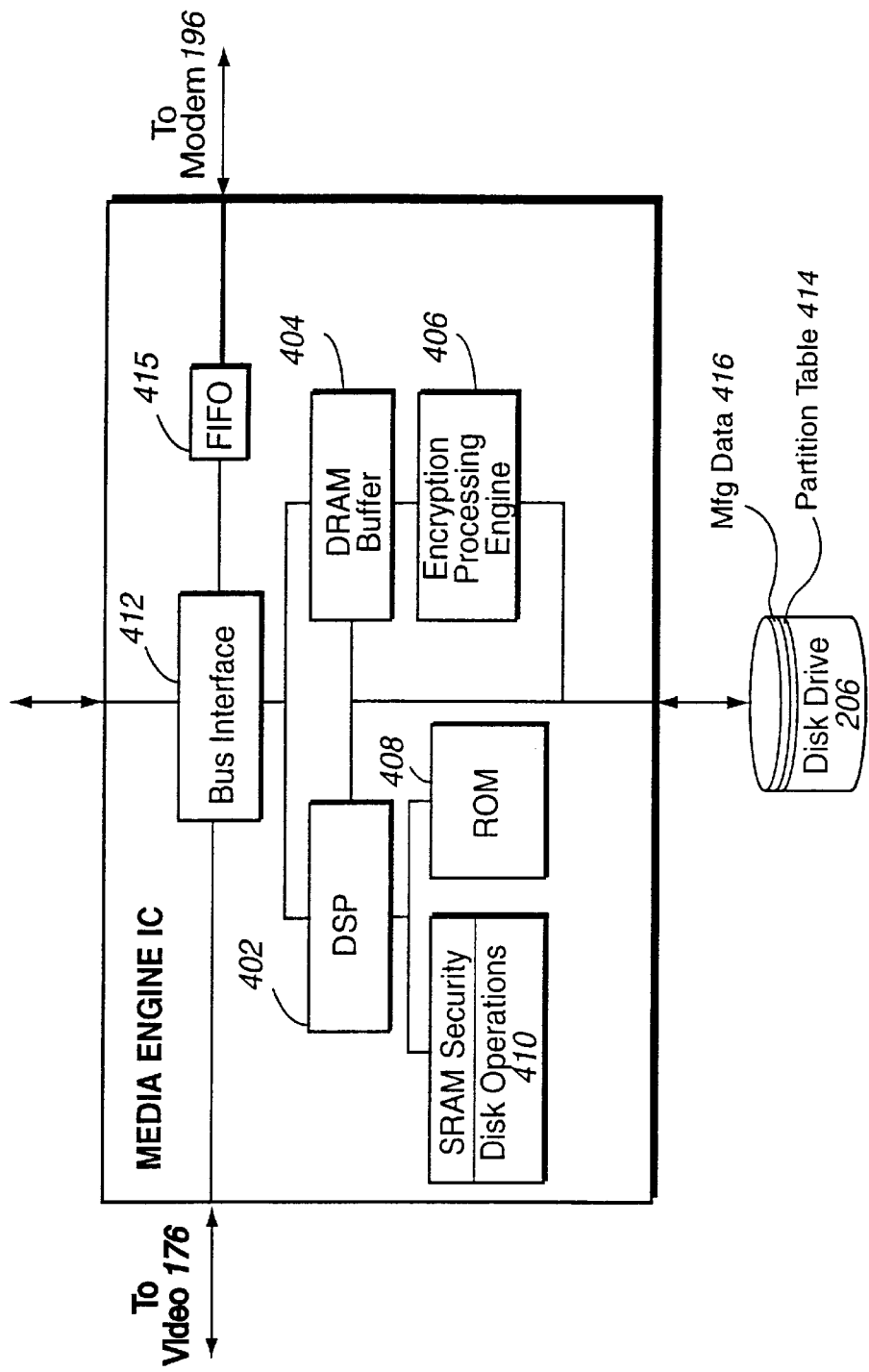
FIG. 13 is a more detailed block diagram of the media engine hardware components.

FIG. 13 is a block diagram of an illustrative processing interface (the Media Engine) between hard drive 206 and video game system console 50. DSP 402 is preferably a 16 bit, fixed-point, OAK core DSP manufactured by the DSP Group. DSP 402 is coupled to static RAM (SRAM) 410 which may, for example, store 5K bytes of information, where 3K bytes are used for main disk control operations and 2K bytes are used for security activities. Security code is loaded into SRAM 410 from protected locations on disk 206 that are inaccessible to video game system 50.

Also coupled to DSP 402 is ROM 408 which may, for example, store 3K bytes of information used to store code for controlling basic disk functions.

SRAM 410 and ROM 408 are used by DSP 402 to provide basic disk activity control, such as controlling servos driving the normal read/write process. In addition, some SRAM 410 and ROM 408 storage is used for security to, for example, store security code. Additionally, certain security code is stored within secure tracks within disk drive 206. The security code in SRAM 410 is paged into the SRAM in part to distribute the security code location in the system. Further security code may be located in ROM 408, and yet further security code may be stored in hard disk drive 206 in encrypted form to be later decrypted by encryption processing engine 406.

The media engine includes encryption processing engine 406. In accordance with a presently preferred embodiment of the present invention, encryption processing engine 406 is a hardware based encryption engine for performing "Two Fish" encryption. The encryption engine 406 performs encryption at a rate of, for example, at least two MBYTES per second. The encryption engine 406 is not able to function until it is enabled by DSP 402 using software loaded from a protected track on hard disk drive 206. The Two Fish encryption engine uses a key length of 128 bits and works in Electronic Code Book (ECB) mode. Cyber Block Chaining or other similar techniques could also be used in place of ECB. The Two Fish encryption algorithm which is used in accordance an illustrative embodiment of the present invention is highly secure and flexible and may be implemented in a variety of ways, depending upon the desired balance of performance variables such as encryption speed, key set up time, code size, RAM, ROM and gate count.

Encryption processing engine 406 permits data to be decrypted on the fly to relieve a significant processing burden on DSP 402. The Two-Fish algorithm is a symmetric algorithm which may be performed in either direction to perform both encryption and decryption.

The encryption processing engine 406 is also utilized to perform a hash algorithm, which in the preferred embodiment is a unique implementation of the Davies/Meyer algorithm. The transformation implemented in performing a hash algorithm, in accordance with the present invention, has the characteristic that it is difficult to reverse (i.e., it is "computationally infeasible" to compute or otherwise find another different instruction/data block that produces the same result). Such transformations are commonly referred to as one-way hash transformations or "cryptographic checksums." In accordance with the presently preferred implementation, DSP 402 utilizes encryption processing engine 406 to implement a hash algorithm (such as the Davies/Meyers hash) to provide assurance that a message has been received uncorrupted.

The media engine interfaces expansion device 95 to the video game system 50 via the bus interface 412 in the manner described in conjunction with control and logic interface 178 shown in FIG. 3. Additionally, the media engine provides an interface with the video system 176 and as described above, with modem 186 using a first in and first out (FIFO) stack 415. Modem 186 requires handshaking operation for data exchange which is controlled by DSP 402. The FIFO 415 buffers data communicated to and from modem 186, as previously described.

As will be explained further below, DSP 402 maintains a partition table 414 and in conjunction with server 101 controls access to the partitions. The partition table 414 cannot be read or written to under the control of video game system 50. DRAM buffer 404 which stores data read from or data written to disk drive 206 is also coupled to DSP 402. The analog interface between hard disk drive 206 and the media engine is not shown in FIG. 13 but has been generally represented in FIGS. 4 and 12.

Figure 14:
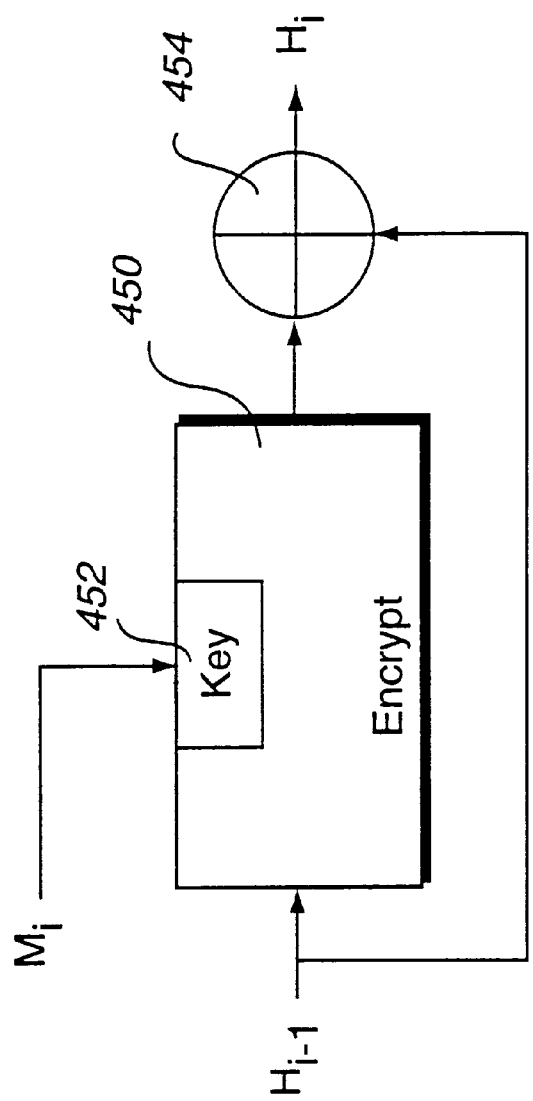
FIG. 14 is a block diagram for explaining the operation of an exemplary hashing algorithm.

FIG. 14 is a block diagram depicting the hash algorithm utilized in conjunction with an exemplary embodiment of the present invention. In accordance with the exemplary implementation, the data for which a hash value is desired is utilized sequentially as a key 452. A clear text message is broken into 128 bit blocks. The key for the implemented algorithm is 16 bytes. The data block size is likewise 16 bytes. In accordance with the preferred implementation, the clear text message, instead of being coupled to the encrypt input, is coupled to the key input and utilized as the key. Thus, the first block is used an encryption key 452 to encrypt a first hash value E which is a constant as is shown below. The encrypted $H_0$ is exclusively "ORed" with $H_0$ (XOR 454) to produce $H_1$. Thereafter, the second block of clear text $M_2$ is utilized as the key to encrypt $H_1$. The Two-Fish algorithm is utilized as the encrypting algorithm in FIG. 14. The process continues recursively until a final hash value is obtained, which is the hash for the entire block.

The exemplary hash algorithm used to provide assurance that a message has been received uncorrupted is shown below. The hash value is calculated for the entire hash except for the hash value itself.

The illustrative embodiment uses a unique implementation of the Davies-Meyer algorithm:

For(i=1ton), $H_i = E_{Mi}(H_{i-1}) \oplus H_{i-1}$ that is graphically shown in FIG. 14, Where: n is the number of 128 bit blocks (e.g., 31 blocks for a 512 byte packet), $H_0$=a fixed constant, $H_{1ton-1}$ are working 128 bit hash value, $H_n$ is the final 128 bit block hash value, $M_{1ton}$ are 128 bit blocks of clear text blocks of the text to be hashed, $\oplus$ is a 128 bit wide bitwise XOR operation, for this exemplary implementation the encryption algorithm to be used is TwoFish.

Turning back to FIG. 13, DSP 402 feeds encryption processing engine 406 the information to obtain the respective hash values. The hash algorithm is used to confirm that 64 k bytes of disk space (hereafter referred to as a chunk) has not been corrupted. A command is issued to DSP 402 from video game system 50 processor causing DSP 402 to step through the 64 k block in order to ensure that the disk data being processed is intact. The hash is performed by accessing each 512 byte logical block array (LBA) to thereby operate on a 512 byte packet in 16 byte pieces to recursively perform the Davies/Meyer hash described above.

The encryption processing engine 406 ultimately returns a hash value for the 64 k byte block of data. In terms of data flow, an LBA is accessed from disk drive 206 and is loaded into the DRAM buffer 404. DSP 402 then feeds 16 byte pieces of the LBA to encryption processing engine 406 for processing as described above until all 512 bytes have been processed. Then, the next 512 byte LBA is accessed, until all LBAs have been encrypted. Once the final hash value is obtained, that value is coupled to the video game system 50.

If a rogue program attempts to access a disk area to which it is not entitled, a security fault occurs due to a violation of security system rules. When a security fault occurs, the media engine DSP 402 responds to such a call, by supplying random data. Thus, no real data is transferred and all fields are filled with random data. Accordingly, writes are responded to normally, except that no data is written to disk 206. This approach is preferred to an approach where the system is shut down in response to such a security fault, since such a shut down provides potentially valuable information to a party trying to breach the security system.

The security system described in the exemplary embodiments utilize various data structures packets which are shown in FIGS. 15A–15G. 15A shows a box ID packet which is an auxiliary packet designed to support e-commerce transactions and provides a mechanism for guaranteeing a unique identification for the particular player's expansion device 95. In the illustrative packets, data may be aligned across, for example, 16 byte encryption field boundaries to thereby spread data over multiple encryption fields to thereby enhance system security.

Unless indicated to the contrary, in all the packets, the box ID field in the packet (e.g., the first 16 bytes) is transmitted in the clear, and all other bytes are preferably encrypted. Each of the packets include a hash at the end to guarantee that the message was not corrupted. Padding fields are interspersed between data packet information fields. The padding field bytes are generated with a random number generating methodology. The encryption engine 406 is used in, for example, electronic code book mode to encrypt each 16 byte piece of data individually in accordance with the electronic code book mode of operation (where in this illustrative mode each 16 byte piece of data is encrypted and left in place). The message ID field is utilized to identify the message type. The direction bit is utilized to indicate whether the packet is going from the server 101 to the expansion device 95 or vice versa. Many of the packets like the box ID packet include a message counter field which is continuously incremented in order to preclude attacks attempting to send the same message repetitively. Thus, by incrementing the counter each time a message is sent, if the same identical message is received a second time, then the security system can conclude knows that the message is invalid.

In the data structure packets which follow, the fields which have been explained above in regard to the box ID packet will not be repeated.

The deleted game packet shown in FIG. 15B confirms that a given message ID identifying a packet type has been deleted or removed from a game. Thus, if desired to give credit for deleting games, the system supports such a feature. A deleted game packet additionally includes a game ID packet which uniquely identifies a particular game. If video game system 50 issues such a packet, DSP 402 may determine whether such a game is supported on disk 206, and if not, returns an indication indicating that the game is not supported The deleted game packet may also be utilized to establish that a game has been deleted.

FIG. 15C shows a game present packet. This packet confirms the presence or absence of a game and may be used to determine which games are present in the system. The message ID for the game present packet is one value if the game ID is present and a second value if the game ID is absent.

FIG. 15D shows an exemplary game ID packet. This packet is utilized internally by the browser to determine which games are present on the system. This packet is not encrypted. With the game ID packet, the browser can present a list of available games on the system to the user.

FIG. 15E is an illustrative context packet. The context packet is utilized when the browser is running, the user decides to start an identified game (e.g., game 14) and a command is issued to play game 14. This command sets the context to game 14, which is specified in the game ID field of the context packet. The DSP 402 accesses partition table 414 shown in FIG. 13 and accesses the three partitions that are associated with game 14. The context packet indicates that the game 14 only has access to the identified three private partitions and the two public partitions. The public partitions are the previously described read/write scratch partition and disk read-only memory (DROM) partition which stores fonts, sound files, including, for example, wave tables and information to which any application program may need to access. Operating systems programs may also be stored in the DROM area. The context packet defines the extent of each partition, so that a game is able to appropriately access the respective partitions. There can only be only a maximum of two set context commands which may be issued. One set context command is for the browser and the second set context command is sued to play a selected game. Challenge and response security features are associated with the set context command to provide an additional layer of security. The context packet is returned when a set context command is issued made. The last value in the packet, i.e., the challenge and response seed is only sent when the first challenge and response is made. When a secure set context command is called the last value is filled with zeros.

FIG. 15F is an illustrative game request packet. The game request packet is part of the core server 101/expansion device 95 communication. All bytes except the first 16 are encrypted with the box key. If during the operation of the browser, a user decides to buy a game, a game request packet is issued. The DSP 402 builds a game request packet as shown in FIG. 15F and sends the game request packet in encrypted form to server 101. The encryption on the game request packet in essence "signs" the game request packet in such a manner to uniquely establish that a particular expansion device 95 requested a particular game. By utilizing a hash field, inside the encrypted transmitted portion, it may be established that no one has tampered with the contents of the message. The server is thereby informed that a particular expansion device 95 wants to purchase a uniquely specified game which is transmitted in a secure fashion by the uniquely identified expansion device.

The server 101, after processing the game request packet shown in 15F, generates a download packet (DL packet) on illustration of which is shown in FIG. 15G. The download packet includes all the information that DSP 402 and the media engine require to create the required partitions. The DL packet includes header information, which includes the game ID and the total length of the packet. The header field also includes a hash of the data to be downloaded to thereby provide a mechanism for ensuring that all the transmitted data arrives intact. The header field also provides a mechanism for resetting counters if necessary. Each partition (designated 0, 1, and 2 in the illustrative embodiment) includes information unique to that particular partition, which is used to set up the partition. Such information will include the access permissions that are allowed, including read-only, encrypted, or read-only clear text, the total number of "chunks" of information to be reserved, and the total number of chunks of information that are actively being used. Such information is provided for each of the three exemplary partitions. A trailer field is provided, which includes the box ID, the message counter and the Davies/Meyers hash which is used as the cryptographic "checksum" for the transmitted message.

The DL packet is of sector length and is encrypted with the box key. In the exemplary embodiment, up two copies of the browser program partition may be sent using two read only partitions.

When the expansion device 95 DSP 402 receives the DL packet, it operates to create the identified partitions and internally writes a partition table bit which indicates that the partitions are in the process of being created and therefore are "dirty". Thus, a "dirty" indication will preclude the partition from being accessed for a game. The partitions at this stage are only able to be written to in order to build the appropriate partition. During this download mode of operation, the disk is write only. The only information fed back to the video game system 50 and to server 101 is the hash of the data to thereby permit the video game system 50 to determine that the disk 206 has been properly written to and the download has been successful.

After the game has been properly and completely downloaded, DSP 402 extracts information from the DL packet header, including the hash of the active protected partitions. The DSP 402 then compares this value with the actual hash of the data in the active partitions. If the hash values match, then DSP 402 has verified that the data has been downloaded correctly without corruption. DSP 402 then changes the partition "dirty" bit to "clean" to thereby indicate that the game is ready to be accessed and executed.

The packets downloaded are 512 bytes in length, which corresponds to one logical block array. The size of the packet downloaded conveys no information to an adversary due to the random padding information interspersed in the packets.

When operations described herein expressly or implicitly involve the generation of random numbers, e.g., the above-identified random padding information, such random numbers are preferably generated using a hardware-based random number generator. For example, in the illustrative embodiments random data may be generated using the servo-system controlling disk access. More specifically, the servo system includes a servo error off-track subsystem for assisting in keeping the read/write head at the correct position. The least significant bits of an error off-track value detected by this subsystem constitutes random data which fluctuates based upon temperature, how long the system has been running, etc. Such a random number is preferably used herein in conjunction with the disclosed encryption techniques.

Turning back to FIG. 13 and disk drive 206 partition maintenance, in an exemplary embodiment of the present invention, five partitions are available to games. No game has access to more than one game program partition. In an exemplary embodiment, the browser has access, for example, to eight partitions.

DSP 402 controls the partitions, including access to the partitions by video game system 50. The disk system is structured such that there are no back door commands to reenter a manufacturing mode after the drive is shipped. Reentry to manufacturing mode requires a special hardware key.

With respect to the hard disk drive partitions, there are shared partitions including a read/write scratch partition and a disk read only memory (DROM) partition. The scratch partition is a read/write partition and is used for interprocessor communication. Every application program is able to read and write to the scratch partition. The scratch partition may therefore be used for transferring data from one game to another. Such game data may be transferred from one game to another in a variety of manners to support head to head and multiplayer game play. As previously noted, the DROM partition stores system information, fonts, sound data as well as system driver software.

There are three partitions which are private to each application. Such private partitions include the game program partition which stores the game program in encrypted form. Game code stored in this partition is stored in encrypted form and is decrypted on the fly when accessed. By storing the game code in encrypted from, security from piracy is enhanced. Any decryption process however, reduces the bandwidth of the data string. A further private partition contemplated in an exemplary embodiment of the present invention includes a game data read only partition which may be used as a read only portion used to store time critical data, such as audio or video clips, in unencrypted form. Information stored in this partition may be accessed more quickly due to savings in decryption processing time. A further contemplated private partition is a game read/write partition where such space may be utilized to store, for example, a player's high scores, game save data, or other game data which the game designer determines would be advantageous to store.

As shown in FIG. 13, also stored on disk drive 206 is factory manufacturing data. This data is part of the security partition which is fixed and includes information burned in at the factory. The information may not be altered at any time after the system leaves the factory. In an exemplary embodiment of the present invention, such factory manufacturing data includes a box ID, which uniquely identifies expansion device 95 to server 101. This value may be disclosed outside the expansion device 95. The factory manufacturing data also includes a boxkey, which is the unique private key used for encrypting communication such as the above-described packets between the expansion device 95 and server 101. The boxkey is also used by server 101 to encrypt games sent to the expansion device 95 and is used by the expansion device 95 to decrypt such games. This value is maintained in secrecy within the expansion device 95. Further manufacturing information includes a game key, which is a unique private key intended for encrypting game programs stored on expansion device 95. This value is maintained in secrecy within expansion device 95. Additionally, the factory manufacturing data includes a cartkey which is a common private key for facilitating installation of limited access cartridge games. This value is secret within the expansion device 95.

Each of the above-described keys may, for example, be 128 bits in length. The encryption keys are stored in area of the disk which is inaccessible outside disk 206. The boxkey, game key and cartkey are not transmitted outside the expansion device 95. The boxkey, game key and box ID are each unique to each individual expansion device 95 and are randomized so that knowledge of one set of such keys will not enable a pirate to determine any other such keys The security system described herein utilizes various identifiers. The message identifier is used in packets exchanged between the server 101 and expansion device 95 to confirm the purpose of the message. The system also uses various game identifiers. The Internet browser program has its own unique game ID. The scratch partition likewise has its own unique game identifier which is used to identify the scratch partition. Similarly, the DROM partition is assigned a unique game ID. There should be only one entry with a scratch partition or DROM partition game ID. In one exemplary embodiment of the invention, the common game ID is utilized during the installation of all game cartridges. A different range of IDs are reserved for cartridge games as opposed to disk games, in accordance with one exemplary embodiment of the present invention.

Turning next to the security procedures initiated during operation of the security system, the process begins with actions which are initiated during booting the system. Initially upon the power being turned on, the security related processor embodied in the peripheral interface 138 (shown in FIG. 2) attempts to communicate with a cartridge security processor 152 (FIG. 2). If no cartridge security processor is detected, the boot routine determines that an expansion device 95 security processor is present and accesses information from the address space where boot ROM 182 (FIG. 11) resides. The video game system 50 then downloads code from boot ROM 182 and begins executing boot ROM code out of main memory RD RAM 300 (FIG. 2). The code execution confirms that the browser is intact by a hash comparison of the nature described above.

If the browser code is intact, the browser is loaded and executed. The user may then browse the Internet or participate in other activities, such as selecting a game to play. As previously indicated, the browser resides on disk 206. In accordance with one exemplary embodiment of the present invention, the browser may be stored in unencrypted readily accessible form to permit faster execution. The browser may, if desired, additionally be stored in encrypted form.

Before the browser may be loaded, a set context command is issued using the browser's ID. In accordance with the preferred embodiment, only two set game context commands may be issued. One to load the browser, and one to load the game. More than two set game context commands results in a security fault. As part of the packet received from expansion device 95 is a seed for challenge and response processing as, for example, shown in FIG. 15E. The seed is a random value generated each time the browser is started.

The user then selects a game to play and a second set context command is issued. The second set context command requires a challenge and response. A request is made for a challenge code and a calculation is performed based on the seed and challenge code, for example, based on an exclusive "OR" (XOR) operation. The video game system 50 returns the value which is used to validate the browser to DSP 402 in expansion device 95. Thus, expansion device 95 boot code execution results in the issuance of a unsecured set context command with the browser ID using the browser game ID. This causes expansion device 95 to set the context of the browser. Expansion device 95 generates a multi-byte challenge and response seed value to be placed in the return sector for the set context command. The boot code copies the set context return data and a small loader to a high memory address. The loader then generates, for example, a one megabyte continuous read from the browser program partition. Upon the challenge and response being satisfied, the pending set context command associated with a particular game ID identifying the game to be played will be issued. The set context command changes the current permissions for accessing the hard drive 206 to switch from the browser partitions to the particular game selected partitions. The context packet returned will, as previously described, define the size of the partitions to which the game has access. By accessing only within permissible partitions defined by this packet, a game will not violate the security rules provided for video game system 50. The game may then be executed by video game system 50. When a game terminates, a reset is initiated which triggers the reloading of the browser.

If a game cartridge is present during the booting process which is not programmed to operate with expansion device 95, video game system 50 executes the program resident in the game cartridge as if expansion device 95 were not interconnected with video game system 50. If a cartridge is loaded which is programmed to operate with expansion device 95, the game cartridge first goes through a registration process which allows such a cartridge to gain access to game data. The cartridge may register in one of two ways, either for limited access or full access. Limited access does not require modem access and creates only a small partition, for example, 200 LBAs or less. Alternatively, the game cartridge may install with full access to the network using the process for disk-based games described below. The cartridge may support upgrading from limited to fill access by saving relevant information to the scratch partition, deleting the single existing partition and then following the procedures described herein for creating full access.

After the game boots from a cartridge, the game issues a set context command and the game is granted access to the disk read/write partition described above. Cartridges can be updated using the normal download procedure for disk games described below. The game cartridge registration process requires the game to provide a cartridge key used for encryption which is used (along with cartridge security processor authentication) to prevent rogue cartridges from running on the system.

The first time a game cartridge attempts to boot, a set context command is issued identifying the game ID. If the game has not been previously registered, processor 402 controls the returning of an indication to video game system 50 that there is no registered game with the identified ID.

The cartridge software then responds by initiating the registration process. The game cartridge then goes through an abbreviated install process where the partitions are set up. However, since no data is downloaded it does not go through the secure download process to be described below. To the extent that the game includes a provision for downloading data via the Internet, the game reserves disk space for this function.

Figure 17A:
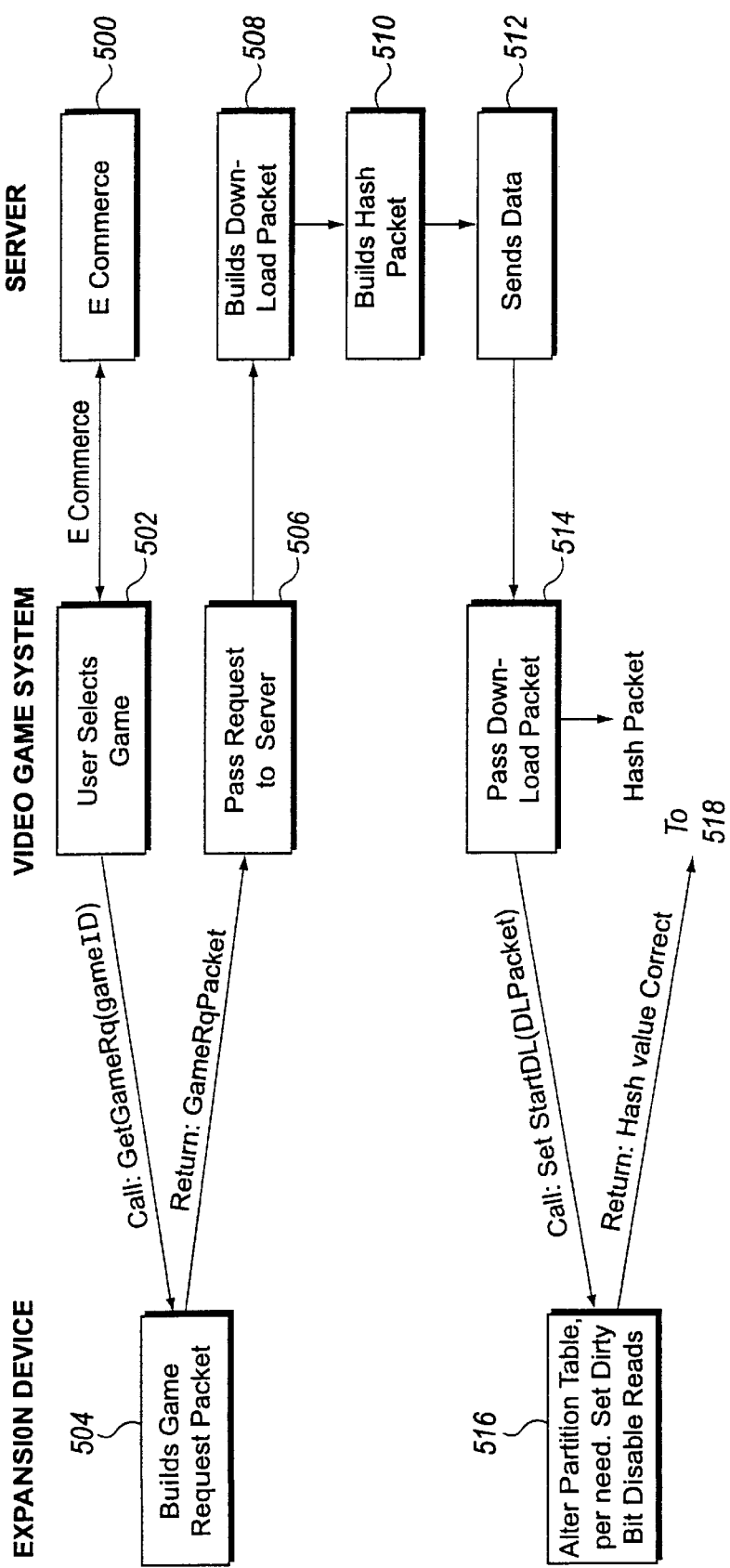
FIGS. 17A and 17B are a flowchart depicting an illustrative download process.
Figure 17B:
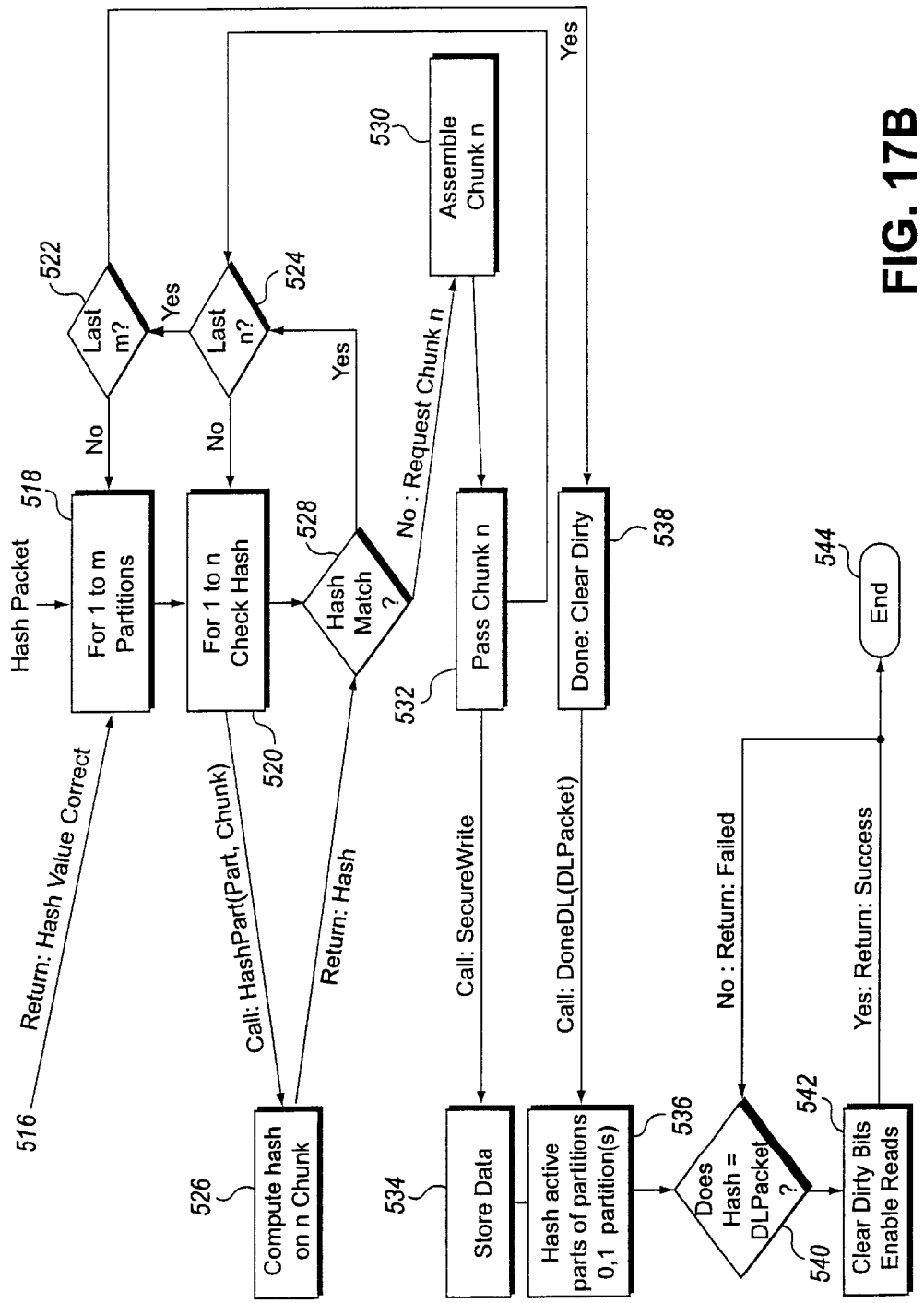

FIG. 17A and 17B is a flowchart depicting the disk game download procedure. As indicated at block 502, the user selects a game for purchasing using the browser and the e-commerce features associated with server 501 including security related features available via the Internet such as RSA's secure socket layer (SSL) resulting in secure Internet communications (500).

The browser responds to the user's game selection identified by a particular game ID by requesting a game request from the media engine processor 402. More specifically, the browser requests from processor 402, a boxkey encrypted GameRqPacket which includes the game ID. If a request includes a game ID that already exists, then the request is denied by processor 402. This packet shown in FIG. 15F includes the box ID, the number of the desired game, a message ID, a direction bit, a message counter, and a 128 bit hash generated by expansion device 95. All components of the packet, except the box ID are encrypted by encryption engine 406 utilizing, for example, the TwoFish encryption algorithm using the boxkey. The game request packet is padded with random bits generated by DSP 402.

As indicated at block 504, expansion device processor 402 builds a game request packet. Expansion device processor 402 places a hash at the end of the request for a game made by the video game system 50 to establish that the request is being made by a uniquely identifiable expansion device 95 and which likewise guarantees that the packet has not been corrupted.

The returned game request packet is then passed by video game system 50 to server 101 by the browser being executed by the video game system 50 (506). The server then builds the download packet previously described in conjunction with FIG. 15G by creating all the information that is to be downloaded to hard drive 206 (508). The server creates hashes for each chunk of data to be downloaded and thereby builds a hash packet (510). The hash packet is a list of hashes for each chunk of data. The executable portion of the game program to be downloaded is encrypted to create hashes for each chunk of the program and each chunk of the data to be loaded into the read only portion of the disk (partition 1). The two packets are combined at block 512 to make a large packet which is transmitted from the server to the video game system (514). The server returns a packet to video game system 50 that includes a DLPacket and a hash packet (512). The browser transfers the DLPacket using a set DLPacket Security call (514). As shown in FIG. 15G, three partitions are included in the DLPacket. The reserved partition size may be larger than the data that will be sent, since some partitions allow for future use. To reduce transmission time the amount of data transmitted may be less than the total size of the partition as reflected by the Plengthreq and Plengthused variables for each partition shown in FIG. 15G.

The video game system 50 removes the hash packet from the transmitted data from server 101 (514) and couples the hash packet to block 518 of FIG. 17B as will be explained further below. The DLPacket is coupled to expansion device 95 as a call consisting of a set startDL (DLPacket) (516). As shown in FIG. 15G and in an abbreviated format in FIG. 16, the DLPacket contains all the information expansion device 95 needs to create the partition table along with the hash of all the packets to be downloaded. Expansion device 95 fills the first of the partitions with the data sent and initializes the rest of the partitions. Any file system components should be included in the downloaded data image sent since, in the illustrative embodiment, expansion device 95 is not aware of any file system.

As indicated at block 516, the expansion device 95 processor 402 evaluates the partition table change request to create a continuous space on the disk. If space is available, the expansion device 95 alters the partitions table to match the request and sets the "dirty" bit on all new partitions. If space is not available, expansion device 95 loads the hard disk 206 data register with a predetermined value or returns the number of available sectors in the hard disk drive data register, if the request fails. If the hash value is correct, expansion device 95 returns an indication of such to video game system 50 as indicated by the input to block 518 in FIG. 17B. If the download packet was corrupted, the return will indicate false to the video game system 50, which prevents any partitions from being created.

FIG. 17B in large part shows the processing for downloading partition data for the first time. This procedure is also used to update data, to restore damaged data or to update a game. Block 518 defines the number of partitions that are being processed where, in this illustration, M=2 corresponding to partition 0 and partition 1. For each partition, each chunk is processed such that expansion device 95 computes the hash for each chunk (526). Block 520 defines the number of chunks that are processed. During the first iteration, the first chunk is processed.

A hash is then computed for the chunk being processed as indicated at block 526. Expansion device 95 returns a hash, which is compared with the hash in the hash packet shown as an input to block 518 (528). The first time that a game is downloaded, the hashes will not match.

A request is then made by video game system 50 to the server for an information chunk. The server assembles a chunk at 530, encrypts the game program, builds a chunk packet and returns it to the video game system browser using the game key. The chunk is transferred to the video game system (532) and then written to the disk at 534.

After video game system 50 passes a chunk (532) to hard drive 206 for storage (534), a check is made at block 524 to determine whether the last data chunk has been processed. If not, the routine branches back to block 520 for processing the next chunk. If the check at block 524 indicates that the last chunk has been processed, then the routine branches to block 522 to determine if the current partition is the last partition.

If upon incrementing to the next partition, it is determined that each chunk has been processed for the last partition (e.g., the second partition) in accordance with the steps described above, then the routine branches to block 538. At block 538, the "dirty" bit is cleared. After processing all chunks, a Done DLcommand is issued (block 538) which couples a DLPacket to expansion device 95. Inside the download packet is a hash for all the downloaded data. Although in accordance with one exemplary embodiment, the DLPacket is transmitted to expansion device 95 at block 538, the DLPacket need not necessarily be transmitted since it had previously been transmitted to expansion device at block 514.

After all the partition 0 and partition 1 data has been transferred, a hash is calculated by expansion device 95 processor 402 (536) in response to the Done DL (DL Packet) command being forwarded to processor 402. If the hash data field of the DLPacket matches the expansion device 95 generated hash, as determined by the check at 540, the partitions are enabled by DSP 402 and the game is ready to play. Thus, digital signal processor 402 calculates a hash on a partition when the download is finished. If the calculated hash equals the value handed down from server 101 in an encrypted packet, then and only then is the download accepted. The "dirty" bit is then cleared and the partition is set to read or read/write.

When the game is ready to play, the "dirty" bits are cleared and reading of the game data is enabled (542). At block 542, the enabling of the "read" status changes the disk 206 from being write only to read only to thereby preclude the game download data from being altered without going through a further download procedure as described above. After the above-described download procedure, the browser can execute the downloaded information as a game. An indication is returned to video game system 50 that the game is ready to play and the routine ends. If the check at block 540 indicates that the hashes do not match, then a failed download indication is sent to video game system 50.

The code for controlling expansion device 95 processor 402 is dispersed between the ROM 408 coupled to DSP 402 and secure locations on disk 206. The decentralization of the security code enhances system security.

The downloaded procedure described above may be utilized to reinstall or update a game. For example, if an error is found in a game, the download procedure may used to correct the error. Alternatively, new levels may be added to a game through an update process. Under such circumstances, there is an exchange between the browser and the server 101 to verify ownership of a game. Preserving data from a previous installment requires adjusting the disk partition table 414. In a reinstall/update procedure, expansion device 95 receives the DLPacket at block 516. The expansion device 95 evaluates the change request by comparing the partition length requested to the existing partition allocations. The expansion device processor 402 determines whether the existing partitions are upgradeable and whether the permissions in the table match. If, for example, only four chunks of data are being downloaded to update the game, the execution of the steps in FIGS. 17A and 17B will reveal that the data corresponding to the new chunks are bad chunks, which will trigger the downloading of the new data. If the hashes match, the data will not be downloaded again. Thus, in accordance with this methodology, only the updated data is downloaded.

With respect to disk game execution, after a game has been downloaded, the browser issues a SecureSetContext (game ID) security call to expansion device 95. The information is copied to an area of RAM reserved for the game to later use. Expansion device 95 processor 402 then sets up bounds checks registers and checks permissions for the game by accessing the partition table 414 and checking the link list that describes the game until changed to verify permissions. If a permission is violated, a security fault results. Games may only access areas or partitions 0 and 1 that are marked as used.

The browser then installs a loader program in a predetermined memory area and transfers control to it. The loader begins to read and store the code into memory in a DMA mode of operation. Because the LBA range of the READ is within the bounds of the partition table entry that describes the game code, the expansion system 95 knows to decrypt the code being placed into SRAM 410 before the DMA operation is done. Once the transfer is complete, control is transferred to the game. The game then access the "context" from the known RAM address. Any reads to the game program partition directs the data transfer through the previously described encryption engine 406 to decrypt the program in real time. The game partition is read only. Only the game program partition can be directed through encrypting engine 406. All nongame program partitions are sent directly to video game system 50 and are not able to be sent to the encrypting engine 406.

The security system described above utilizes various application program interface (API) calls to expansion device 95. These functions may be built into the operating system for video game system 50 and may be executed by either games or the browser. Those calls which implement security functions are preferably executed by the browser. The most common calls will be read/write related calls.

The calls utilize various parameters. The start LBA parameter defines the starting logical block address of data to be transferred. Each partition starts at 0 since in the exemplary embodiments the partitions are logical partitions and are not physical-address based. The parameter nbrLBA defines the number of logical block addresses that are being transferred. A game ID parameter uniquely identifies a game. A sector parameter denotes, for example, a 512 byte packet (LBA) transferred to the hard disk drive data buffer 404. A sector is also sometimes referred to as a block. The internal format of data within a sector changes according to call. The start address parameter refers to an address in main memory (RDRAM) to which information from the DRAM buffer 404 in the media engine transfers data to or from. A write call may be specified by writing to disk 206 starting at a start LBA offset in a particular partition for a particular number of LBA sectors while transferring the data from a specified start address in main memory. Data may be read off disk 206 from a particular partition and transferred to a particular address in main memory 300 shown in FIG. 2 using a similar parameter specification.

The software interface includes a call requesting the expansion device 95 to scan a chunk of disk in partition 0 or 1, for example, and perform a hash for a particular game. A set context call is used to set the partitions for a browser or a game. A start DL call is used for both creating the partitions as well as updating/repairing the contents of the partitions as explained in the download related flowchart of FIG. 17A and 17B. A done DL call terminates the download process. If the hash in the DL packet matches the expansion device 95 generated hash of the used chunks of partitions 0 and 1, then the "dirty" bit is cleared and the game partitions are available. A get game IDs call allows a user to read a list of currently installed game IDs in the partition table 414. A load partition call is used during the download process to allow the issuer to write a number of LBA sectors to hard disk drive 206. This call supports application installation. The call may only be issued immediately after set DLPacket and only to partitions marked as "dirty" in a partition table. A get game request call returns an associated packet in the hard disk drive data buffer 404. A secure start DL call continues the download process where the get game request call leaves off. This call is used both for creating the partitions and updating/upgrading/repairing the contents of the partitions.

All secure calls cause the execution of a challenge response call. Secure calls require that the challenge and response calls be made prior to any secure call. No other hard disk drive activity may occur between challenge, response and the desired secure call. Secure calls can only be made if expansion device 95 is in the browser context. The use of challenge and response enhances system security.

In a get challenge call, expansion device 95 generates 16 bytes and returns that data in the first 16 bytes of the disk data buffer 404. The browser takes the 16 bytes from the get challenge call and exclusively "OR's" the value against a stored value and returns the result using a set response call. The returned value is stored for use in the next challenge and response cycle. The first challenge and response cycle uses a seed provided as the return value. If the video game system returns an inaccurate value, the expansion device generates a security fault.

FIG. 18A is an illustration of an exemplary partition table stored in disk drive 206. An associated partition table status bit table is shown in FIG. 18B. By way of example only, the disk is divided into a 128 logical block address contiguous areas called chunks. The partition table requires, in this example, 24 bytes per game. The exemplary partition table supports 1023 entries. The partition table in this example requires 24,552 bytes or 48 sectors. The remaining 24 bytes may used for other persistent storage usage. In the partition table, the game ID is associated with chunks of disk space which make up the partition. Each chunk has a start address defined by a logical block array within the hard drive 206. Additionally, a partition is defined by a status byte shown in FIG. 18B, which indicates whether a download is in progress or whether an associated game is ready to play. If a game is deleted, the partition table needs to be compacted. A status bit indicates that compaction is in progress in the identified partition. Additionally, the partition status indicate whether a particular partition is being used.

Those skilled in the art will appreciate that some or all of the features of the above-described video game/security system may be implemented on hardware configurations other than the hardware configuration described above. Generally speaking, the program code for video games is written to run on a particular hardware configuration. One way to run a game on a different hardware configuration is to re-write the program code taking into account the different configuration. Accordingly, it is contemplated that some or all of the features of above-described video game/security system may be utilized on other hardware configurations by writing program code appropriate for those hardware configurations.

Another way to play a game on a different hardware configuration is to write a program (an emulator) that simulates the hardware and/or firmware that the game program was written to run on. An advantage of this solution is that one emulator of a particular hardware configuration can, in theory, run all of the game programs written for that hardware configuration. In the context of video games, an emulator is a software program that is designed to allow a game program to run on a hardware configuration (platform) other than the hardware configuration for which the game program was written. For example, emulator software may be developed which allows games written for the above-described console-based preferred embodiment to be played on personal computers, MACINTOSH-based computers and even other console-based systems. Running the emulator software along with ROMs (often used to refer to game programs by video game emulator designers) permits a user to play games originally developed for another hardware configuration on, for example, a personal computer. The purpose of emulator is to actually simulate the processor and peripheral circuitry that the games need to play. In use, the emulator software functions as the "hardware" of the game and the ROMs function as the "software".

As will be appreciated by those skilled in the art, a personal computer system will include a processing unit and a system memory. A system bus couples various system components including system memory to the processing unit. The system bus may be any of several types of bus structures including a memory bus or memory controller, a peripheral bus, and a local bus using any of a variety of bus architectures. The system memory may include read only memory (ROM) and random access memory (RAM). A basic input/output system (BIOS), containing the basic routines that help to transfer information between elements within personal computer system, such as during start-up, is stored in the ROM. The personal computer system further includes various drives and associated computer-readable media. A hard disk drive reads from and writes to a hard disk; a magnetic disk drive reads from and writes to a removable magnetic disk; and an optical disk drive reads from and, in some configurations, writes to a removable optical disk such as a CD ROM or other optical media. In such a personal computer the hard disk drive, magnetic disk drive, and optical disk drive are connected to the system bus by a hard disk drive interface, a magnetic disk drive interface, and an optical drive interface, respectively. The drives and their associated computer-readable media provide nonvolatile storage of computer-readable instructions, data structures, program modules, game programs and other data for the personal computer system. In other configurations, other types of computer-readable media that can store data that is accessible by a computer (e.g., magnetic cassettes, flash memory cards, digital video disks, Bernoulli cartridges, random access memories (RAMs), read only memories (ROMs) and the like) may also be used.

A number of program modules may be stored on the hard disk, removable magnetic disk, optical disk and the ROM or the RAM of system memory, including an operating system, one or more application programs, other program modules, program data and game data. A user may enter commands and information into personal computer system through input devices such as a keyboard and pointing device. Other input devices may include a microphone, joystick, game controller, satellite dish, scanner, or the like. These and other input devices are often connected to the processing unit through a serial port interface that is coupled to system bus, but may be connected by other interfaces, such as a parallel port, game port or a universal serial bus (USB). A monitor or other type of display device is also connected to the system bus via an interface, such as a video adapter. In addition to the monitor, the personal computer system will typically include other peripheral output devices, such as speakers and printers.

A personal computer also typically includes a modem or other means for establishing communications over a wide area network, such as a modem for accessing the Internet. The modem may be internal or external, and is connected to the system bus via a serial port interface.;

A game program generally includes program instructions and data for sound, graphics, movements, etc. An emulation system will typically use a host processing system, an emulator, and a ROM. As noted above, the host processing system may be a personal computer, MACINTOSH or another game console. The emulator fetches program instructions from ROM and converts these program instructions to a format usable by the host. For example, in the case where the game program is written for execution on a platform using a Z-80 processor and the host is a personal computer using an Intel processor, the emulator fetches the Z-80 program instructions and converts these program instructions to one or more Intel program instructions. Similarly, the emulator fetches game data such as video and audio data and converts this data into a format or formats usable by the host. In the case of video and audio data, these formats may be formats suitable for a specific graphics or sound card of the host. Sophisticated game consoles often include one or more ASICs in addition to a processor for executing game instructions and processing game data. An emulator for emulating such game consoles is configured to emulate both the processor and the ASICs.

An emulator used to provide some or all of the features of the video game system described in the present application may also be provided with a front end. The front end may provide a graphic user interface (GUI) for the emulator and simplify or automate the selection of various options and screen modes for games run using the emulator.

It is predictable that the above-described security system will be attacked from a variety of fronts. For example, third party developers will attempt to circumvent the security measures described herein and sell games directly to consumers via a downloading process. Under such circumstances, the quality or nature of the games (including the amount of violence or pornographic type material) played on the video game system will not be controllable. The security system described herein protects against such downloading by only allowing expansion device 95 to download through an associated server 101 that has the above-described security features. In such a security system packets are downloaded which have associated hashes and other security features which prevent a third party developer from downloading a game such that it can later be executed by the system. Additionally, the approach of encrypting a game uniquely for each individual expansion device 95 hard drive makes it unfeasible for such a developer to download a game which later can be executed since decryption of such an encrypted game is required for execution.

Another type of security threat flows from a user switching to a different service provider for Internet access, who may not provide the level of security that a recommended provider may provide. In the disclosed system, the browser program is protected utilizing the security measures protecting other application programs. The present security system prevents many service provider related attacks because the browser isn't tied to the service provider and the browser cannot be modified due to the above-described security measures.

Malicious attacks by parties desiring to disrupt the system are prevented by not allowing execution of code which is not downloaded or otherwise authorized. The use of an unauthorized cartridge is a simple way to introduce attack code into expansion device 95. A security chip, however, is required to boot from a cartridge. A security chip might simply be added by creating a passthrough port using an authorized cartridge. The passthrough port may allow an unauthorized cartridge to load the needed code for the security chip. By loading code from a legal cartridge and using the security chip from a legal cartridge, the security chip may be bypassed. However, this mode of attack is not effective against the present security system because essentially all the security is resident or otherwise associated with expansion device 95 and not the video game system 50. Such a cartridge would not contain code that could be executed given the registration process described above.

A further potential attack on the security system is the so-called "man in the middle" attack, where a device is inserted in between expansion device 95 and the video game system to intercept transmissions between the two devices. Such an attack would not be fruitful in accordance with the present security system, where the security is resident within expansion device 95 and essentially no trust is given to the video game system 50. A "man-in-the-middle attack" between the expansion device 95 and the server will not circumvent the security system due to the strong security between the expansion device 95 and the server associated with, for example, the download process. Additionally, by moving the security features into the expansion device 95, protection is provided from attempts to alter the code stored in the hard drive 206.

Another area of attack might be provided by attempts to spoof the server, which if successful, would trick the browser into allowing an unauthorized server to download unauthorized games. By using encrypted hash packets which are required to go between the server 101 and expansion device 95, such attacks will be very difficult. Moreover, if the security for a particular expansion device 95 is cracked due to discovery of encryption keys, by some unknown mechanism, such a security breach would not be a generic solution which would work with any other expansion device 95, due to the unique cryptographic keys utilized for each expansion device.

A further attack on the security system might be provided by a special device pretending to be the video game system 50 with which the expansion device 95 is designed to interact. Such an attack will not be fruitful with the present security system which does not trust anything generated by video game system 50. Video game system 50, from a security system's point of view, merely facilities communication between expansion device 95 and server 101.

While the invention has been described in connection with what is presently considered to be the most practical and preferred embodiment, it is to be understood that the invention is not to be limited to the disclosed embodiments, but on the contrary, is intended to cover various modifications and equivalent arrangements included within the spirit and scope of the appended claims.

I claim:

1. A video game system for executing a video game program and generating game play graphics for display on a user's display comprising:
   a game processing system for executing a video game program and generating game play graphics on a user's display;
   communications circuitry, coupled in use to said game processing system and to a user's communications network, for linking said game processing system to a server;
   a writeable mass storage device coupled in use to said game processing system for storing at least graphics data loaded therein, wherein said writeable mass storage device has a unique security code associated therewith,
   a mass storage device controller including cryptographic processing circuitry for performing encryption operations using said unique security code, for controlling access to said writeable mass storage device, and for generating a game request packet and transmitting the game request packet to said server.

2. A video game system according to claim 1, wherein said unique security code is a unique ID associated with said mass storage device which is associated with at least one encryption key that is used during encryption processing.

3. A video game system according to claim 1, wherein said mass storage device is operable to store a partition table defining the mass storage device partitions which are accessible to a game program and wherein said mass storage device controller is operable to maintain said partition table.

4. A video game system according to claim 1, wherein said mass storage device controller cryptographic processing circuitry includes processing circuitry for decrypting encrypted game program instructions accessed from said mass storage device.

5. A video game system according to claim 3, wherein an executing game program has access to a plurality of private partitions defined by said partition table.

6. A video game system according to claim 1, wherein said mass storage device controller includes a digital processor coupled to said cryptographic processing circuitry and to said mass storage device, wherein said cryptographic processing circuitry is operable to compute a hash value for ensuring that information transmitted between said server and said mass storage device controller has not been corrupted.

7. A video game system according to claim 1, wherein said mass storage device stores said unique security code which is loaded during the manufacturing process and which is used during cryptographic operations.

8. A video game system according to claim 7, wherein said unique security code includes at least one private encryption key.

9. A video game system according to claim 7, wherein said unique security code includes a mass storage device identifier uniquely identifying a particular mass storage device.

10. A video game system according to claim 1, wherein an executing video game is only permitted to access predetermined partitions of said mass storage device under the control of said mass storage device controller.

11. A video game system according to claim 1, wherein said server is operable to download a video game in response to an encrypted game request uniquely identifying the requesting mass storage device.

* * * * *